United States Patent [19]

Suzuki et al.

[11] Patent Number: 5,144,683
[45] Date of Patent: Sep. 1, 1992

[54] CHARACTER RECOGNITION EQUIPMENT

[75] Inventors: Hideaki Suzuki; Kichie Matsuzaki, both of Yokohama; Kazuo Kato, Yamato; Mitsuo Oono, Hadano; Kenzo Takeichi; Ryoichi Hisatomi, both of Tochigi; Mitsunobu Isobe, Machida; Shigeru Fujimori, Hadano; Kouzou Nemoto, Tochigi, all of Japan

[73] Assignee: Hitachi, Ltd., Tokyo, Japan

[21] Appl. No.: 514,608

[22] Filed: Apr. 26, 1990

[30] Foreign Application Priority Data

Apr. 28, 1989 [JP] Japan ................................ 1-107844

[51] Int. Cl.⁵ ............................................. G06K 9/46
[52] U.S. Cl. ...................................... 382/16; 382/25; 382/27
[58] Field of Search .................... 382/25, 18, 9, 50, 16, 382/27, 54, 10, 14, 15

[56] References Cited

U.S. PATENT DOCUMENTS

| | | | |
|---|---|---|---|
| 3,999,161 | 12/1976 | van Bilzem et al. | 382/25 |
| 4,783,827 | 11/1988 | Izumi | 382/18 |
| 4,783,838 | 11/1988 | Matsunawa | 382/27 |
| 4,887,303 | 12/1989 | Hongo | 382/27 |
| 4,903,313 | 2/1990 | Tachikawa | 382/27 |
| 4,989,258 | 11/1991 | Takahashi et al. | 382/18 |

FOREIGN PATENT DOCUMENTS 60-96309 5/1985 Japan .

OTHER PUBLICATIONS

Rumelhart et al., "Learning Representation by Back-Propagating Errors", Nature, vol. 323 Oct. 9, 1986.

Primary Examiner—Joseph Mancuso
Attorney, Agent, or Firm—Kenyon & Kenyon

[57] ABSTRACT

The present invention relates to a character recognition equipment which is capable of recognizing with high accuracy those characters that have poor contrast and produce variation in printing density such as characters printed on industrial products.

The character recognition equipment according to the present invention is composed of an input unit group which processes in image in a plurality of window regions that are set on a character image, a feature unit group which performs calculation on values obtained by adding thresholds to the output values therefrom, and an output unit group which performs calculation on values obtained by multiplying output values from the feature unit group and adding the thresholds to the sum total thereof. Here, the thresholds and the weights can be adjusted automatically with an actual object image.

44 Claims, 26 Drawing Sheets

FIG. 5

*FONT REGISTRATION (FEATURE     )     * JOB    n
                                             STAGE  n

REGION NO.
1 2 3 4 5 6 7 8 9 A B C D E F G H I J K L M N O P Q R S T U V W X Y Z

CHARACTERS  0
            1
            2
            3
            4
            5
            6
            7
            8
            9
            A
            B
            C

CHARACTER'S LINE (YES) OR (NO) SETTING

FIG. 6

```
***  FONT REGISTRATION (FEATURE)        *** JOB    n
                                             STAGE  n

X         Y
       PRESS YES KEY WHEN SETTING IS COMPLETED
     O
      123456789ABCDEFGHIJKLMNOPQRSTUVWXYZ
```

```
012
    3456789ABCDEFGHIJKLMNOPQRSTUVWXYZ
    WILL CHARACTER OUTER FRAME SIZE BE CHANGED?
```

```
O
 123456789ABCDEFGHIJKLMNOPQRSTUVWXYZ
 SET CHARACTER OUTER FRAME POSITION AND PUSH
 SET KEY
```

```
O
 123456789ABCDEFGHIJKLMNOPQRSTUVWXYZ
```

FIG. 8

```
***FONT REGISTRATION (FEATURE )        *** JOB    n
                                           STAGE  n

CHARACTER'S LINE DIRECTION

1. LONGITUDINAL (LEFT)
  2. LONGITUDINAL (RIGHT)
  3. LATERAL (UPPER)
  4. LATERAL (LOWER)
  5. THE WHOLE

CHARACTER'S LINE DIRECTION =
```

CORRECTED VALUE OF CONTRAST BETWEEN
BACKGROUND AND CHARACTER'S LINE $$= \frac{\text{CONTRAST BETWEEN BACKGROUND AND CHARACTER'S LINE USED FOR ADJUSTMENT}}{\text{BRIGHTNESS OF BACKGROUND USED FOR ADJUSTMENT}}$$

$\times$ BRIGHTNESS OF BACKGROUND

FIG. 12

```
*** CHECK CODE SETTING ***      JOB    n
                                STAGE  n

CHECK CODE :

CHECK CODE =
```

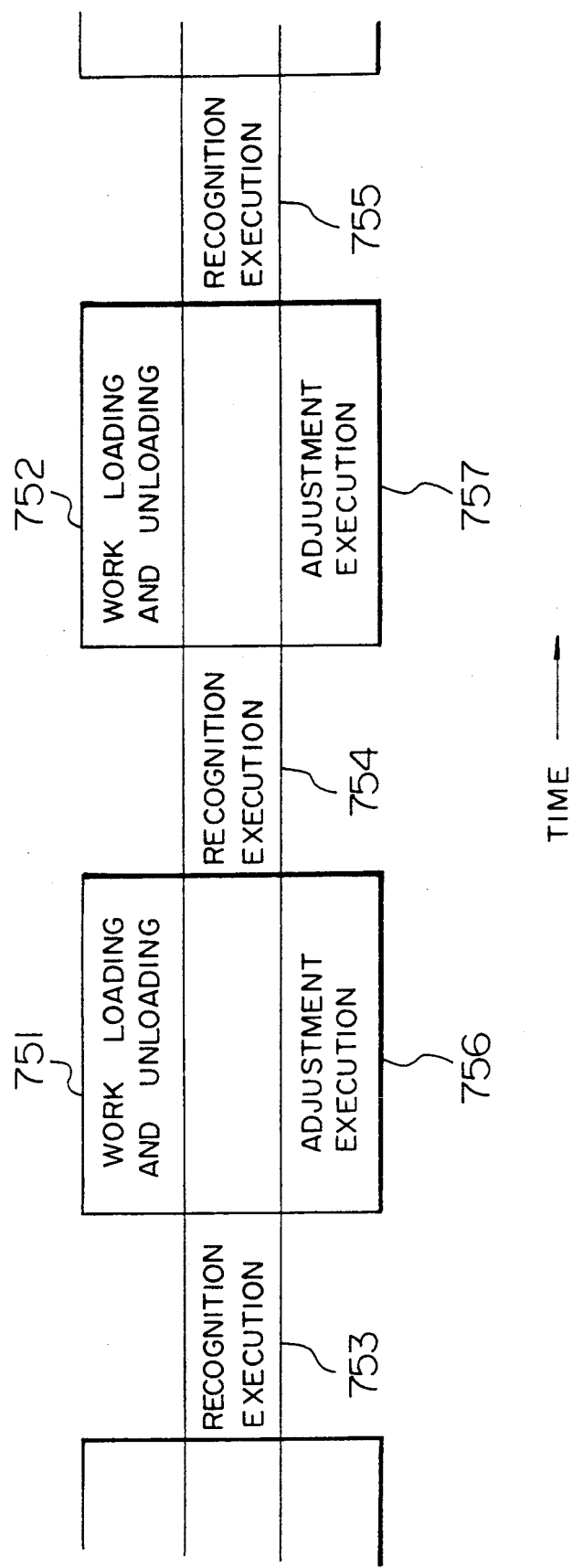

FIG. 27

\*\*\* INPUT UNIT COMBINATION SETTING AND ALTERATION \*\*\*

INPUT FEATURE UNIT NO.
FEATURE UNIT NO. = 1

SETTING FLAG = SET
1st. TERM INPUT UNIT NUMBER = 1
  INPUT UNIT NO. = 1
2nd. TERM INPUT UNIT NUMBER = 2
  INPUT UNIT NO. = 2,3

INPUT SETTING ITEMS
 1. COMBINATION SETTING
 2. COMBINATION DELETION

SETTING ITEM = 1

FIG. 28

```
***   FONT ADJUSTMENT   ***

1.  DATA TRANSMISSION
  2.  ADJUSTMENT PARAMETER SETTING
  3.  CHARACTER PARAMETER SETTING
  4.  ADJUSTMENT EXECUTION
  5.  WINDOW EVALUATION
  6.  WINDOW SETTING
  7.  WEIGHT DATA SETTING
  8.  CHARACTER TYPE ALTERATION
  9.  STATISTICAL ANALYSIS
 10.  END

OPERATION NO. =
```

CHARACTER RECOGNITION EQUIPMENT

BACKGROUND OF THE INVENTION

The present invention relates to a character recognition equipment for imprints, printed matter and stamped characters, and more particularly to a character recognition equipment suitable for recognizing characters having poor contrast between the characters and the background and having varied printing quality.

Conventional character recognition equipment utilizes an application of a pattern matching method in which a character pattern is divided in a plurality of sections and recognition judgement is made by comparing and collating the degree of resemblance for every division unit as described in Japanese Patent Laid-Open No. 61-255488 for instance. This method is a recognition algorithm using a binary image. When a change such as breaking and thinning are produced in a character's line, processing becomes complicated and recognition time becomes longer because such variation is absorbed by the recognition algorithm. For example, a binarized threshold also becomes unable to correspond to characters printed with varying quality with a fixed threshold. Besides, such recognition algorithm is performed by classifying extracted features in accordance with a judgement tree, but the way of combining these features for obtaining an optimum judgement has been obtained through experiments in a trial-and-error manner. Since the above-described conventional technique depends on the application of a pattern matching method and is a recognition algorithm using a binary image, a satisfactory result is obtainable for character recognition of paper with good printing quality and the like. However, when the contrast of characters to be recognized is poor and breaking and thinning are produced when binarized there are problems. The recognition algorithm thereof becomes complicated, thus making the recognition time longer and the misrecognition rate higher.

SUMMARY OF THE INVENTION

It is an object of the present invention to provide a character recognition equipment which is capable of recognizing characters having poor contrast and having varied printing density such as characters printed on industrial parts safely and with high accuracy. The present invention is also automatically adaptable to character style variations.

In order to achieve the above-described object, a character recognition equipment of the present invention is composed of an input unit group which processes images in a plurality of window regions that are set on the character images and outputs the result, a feature unit group which performs operations on the values obtained by adding thresholds to the outputted result values from the input unit group and outputs values, and an output unit group which performs operations on the values obtained by multiplying the output values from the feature unit group by weights and adding thresholds to the sum total thereof, wherein the thresholds and the weights may be adjusted automatically depending on characteristics of an image of an actual object. Furthermore, when a character string consisting of a plurality of characters is recognized, the type of a character of the recognition object is designated for each column of the character string, the thresholds and the weights are held separately for each column of the character string, and character recognition is performed using them.

In the above-described character recognition equipment, a mechanism that is capable of sampling features of the character with high accuracy and is able to learn how to weight a plurality of features automatically from an actual sample character is implemented for the purpose of optimizing the combination among the features. Two types of informations, not only brightness information of the character's line, but also edge information detected from the differential image of an original image, are used in each of a plurality of windows provided appropriately in the character region, thereby making it possible to sample features stably with high reliability even for a printing character of poor contrast. Moreover, as to the method of determining the combination of features, automatic adjustment is performed by utilizing the actual sample image, thereby performing stabilized recognition.

BRIEF DESCRIPTION OF THE DRAWINGS

FIG. 5 is an explanatory view showing a scope in which a user sets an initial value of the weights shown in FIG. 4 through the user's judgement;

FIG. 6 is an explanatory view showing a scope in which the positions and the sizes of the window regions of FIG. 1 are set;

FIG. 8 is an explanatory view showing a scope in which the type off processing in the image processor of FIG. 1 is set;

FIG. 12 is an explanatory view showing a scope in which the number of columns is set when the method of reducing misrecognition in FIG. 11 is employed;

FIG. 23 is an explanatory diagram showing a time chart when a character recognition equipment of the present invention adjusts thresholds and weights while performing recognition;

FIG. 27 is an explanatory view for setting the combination for combined feature unit;

FIG. 28 is an explanatory view showing an example or a processing menu of a work station connected to the character recognition equipment.

DETAILED DESCRIPTION

An embodiment of the present invention will be described hereafter with reference to FIG. 1 through FIG. 24.

Figure 1:
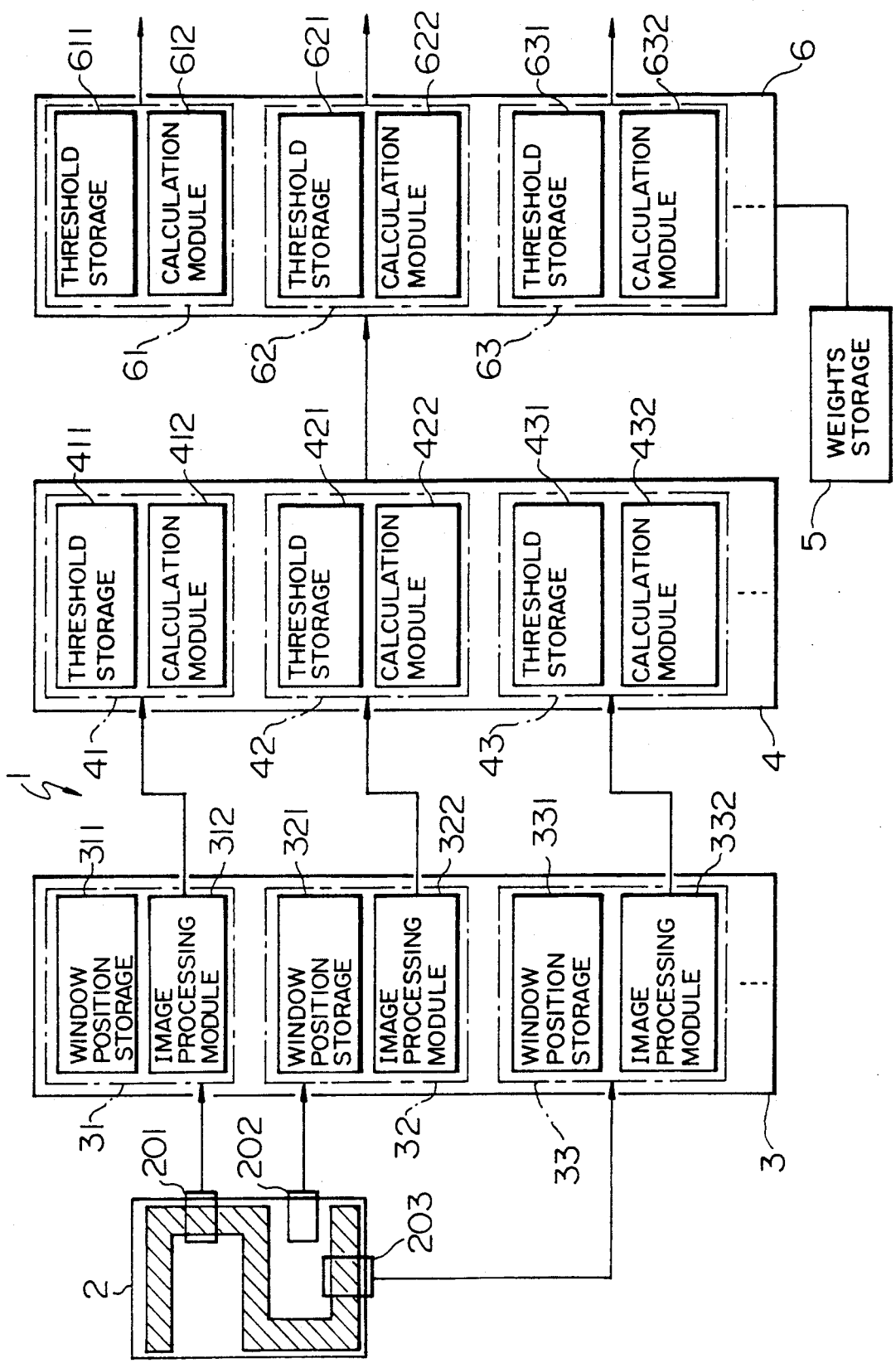
FIG. 1 is a block diagram of a character judgement module showing an embodiment of a character recognition equipment according to the present invention.
Figure 2:
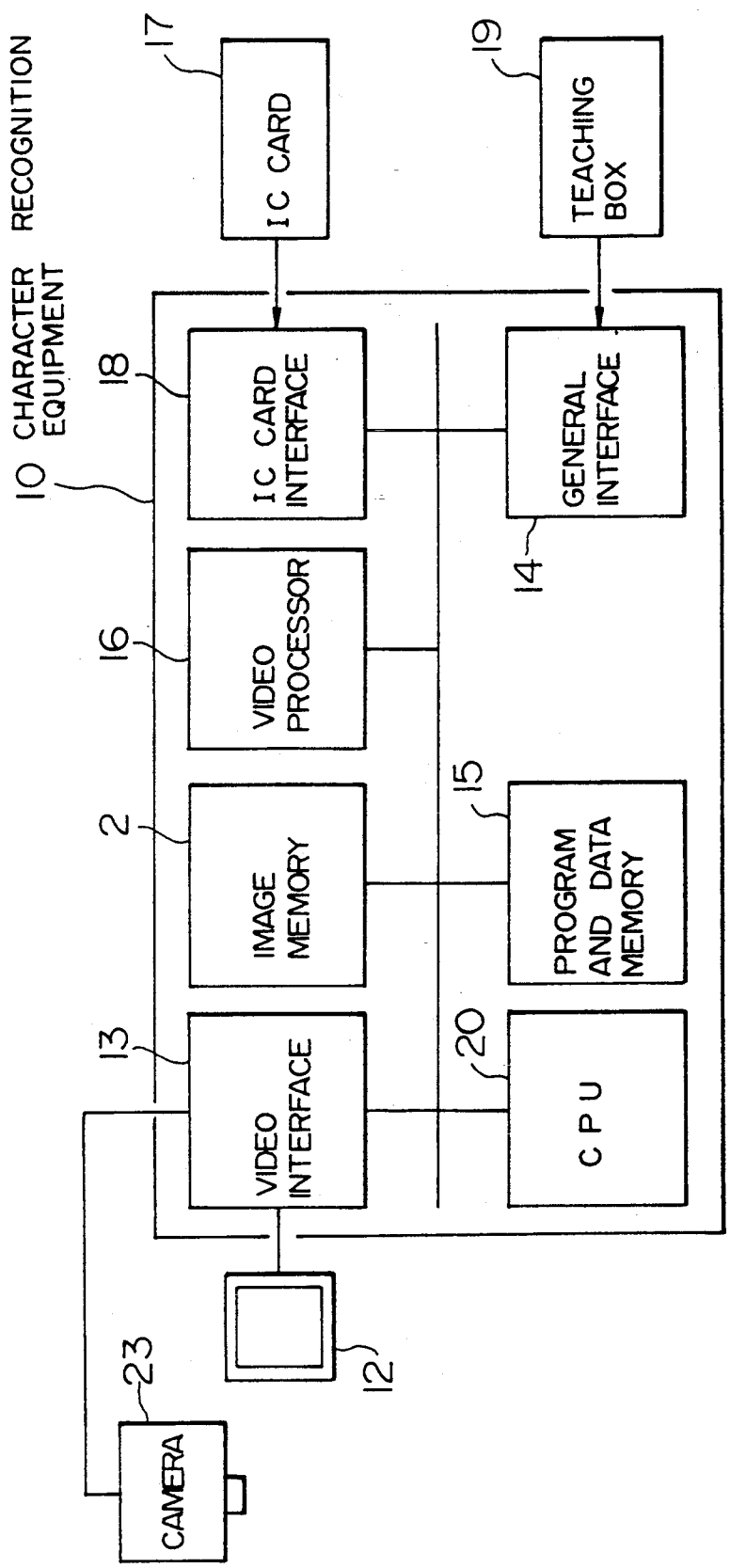
FIG. 2 is a hardware block diagram of the character recognition equipment shown in FIG. 1.

FIG. 1 is a block diagram of a character judgement module showing an embodiment of a character recognition equipment according to the present invention. In FIG. 1, a character image of an object to be recognized is taken into an image memory 2 of a character judgement module 1 by means of a TV camera 23 (FIG. 2). In a input unit group 3, there are provided window position storages 311, 321, 331, . . . which store window position data and image processing modules 312, 322, 332, . . . in each of respective input units 31, 32, 33, . . . , image processing is performed in respective window regions 201, 202, 203, . . . on the image memory 2 and processing results are output and the values of processing results are sent to a feature unit group 4. In respective feature units 41, 42, 43, . . . of the feature unit group 4, there are provided threshold storages 411, 421, 431, . . . which store thresholds and feature unit calculation modules 412, 422, 432, . . . . An operation is performed in values obtained by adding thresholds to the output values from respective input units and operation results are output. The output values of respective units of this feature unit group 4 are multiplied by weights which are stored in a weight storage 5, and these values are sent to an output unit group 6. In the output unit group 6, there are provided output units 61, 62, 63, . . . which correspond to the types of characters, and in respective output units, there are provided output threshold storages 611, 621, 631, . . . which store thresholds and output unit calculation modules 612, 622, 632, . . . , in which operation is performed on the values obtained by adding thresholds to the sum total of the values obtained by multiplying the output values from respective feature units by the weights, and the results of operation are output.

FIG. 2 is a hardware block diagram of the character recognition equipment shown in FIG. 1. In FIG. 2, a character recognition equipment 10 is composed of a video interface 13 which receives a signal from the TV camera 23 and stores it in an image memory 2, and also outputs it to a monitor TV 12, a general interface 14 for performing input/output of an external signal to and from an equipment other than the character recognition equipment such as a work station, a program and data memory 15 which stores programs and data, a video processor 16 which performs image processing, an IC card interface 18 for connecting with an IC card 17 used for preservation of various data, a teaching box 19 for manual operation such as teaching, and a CPU 20 which controls the whole of above-described operation. Here, the character judgement module 1 (FIG. 1) is implemented with the image memory 2, the program and data memory 15, the video processor 16 and the CPU 20. That is, window position storages 311, 321 and 331 of the input units, threshold storages 411, 421 and 431 of the feature units, a weight storage 5 and output threshold storages 611, 621 and 631 of the output units are located in the program and data memory 15. The image processing modules 312, 322 and 332 are implemented with the video processor 16 and the CPU 20, and the feature units calculation modules 412, 422 and 432 and the output units calculation modules 612, 622 and 632 are implemented with the CPU 20.

Next, a process in which the character judgement module 1 judges a character will be described. FIG. 1 shows a case in which a character "2" is input to the image memory 2, window positions are stored in window position storages 311 and 321, etc. of respective input units, and the type of image processing is also designated. Accordingly, is differential from the right is designated as the type of image processing for an image in a window region 201, the input unit 31 performs differential processing thereof and outputs the result. Similarly, if differential from the right is designated as the type of image processing for an image in a window region 202, the input unit 32 performs differential processing thereof and outputs the result. There are differential from the right, differential from the left, differential from the top, differential from the bottom, density sum and the like as the type of such image processing. The method of processing is shown in FIGS. 3A–3C in the case of differential from the left for instance.

Figure 3A:
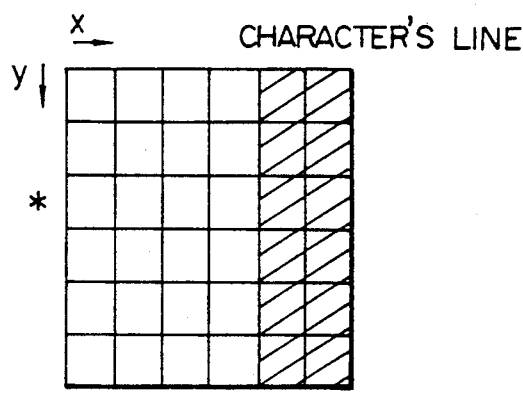
FIGS. 3A, 3B and 3C are explanatory diagrams showing a processing example in an image processor of the input unit shown in FIG. 1.
Figure 3B:
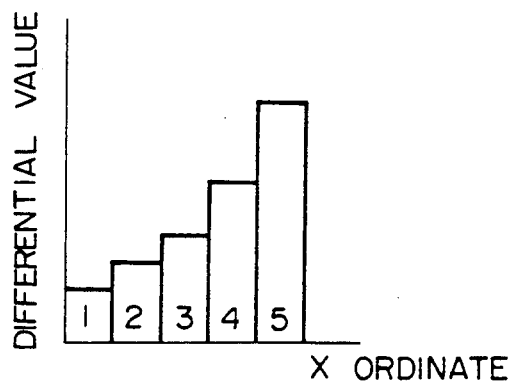
Figure 3C:
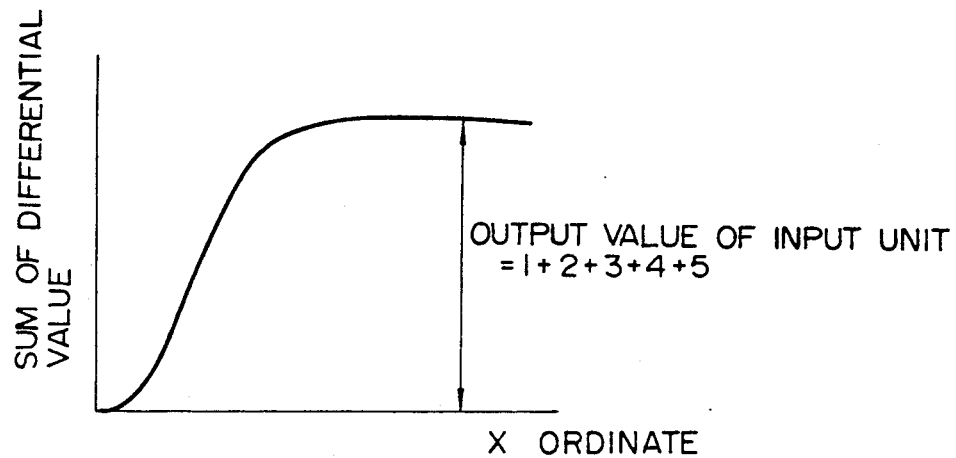

FIGS. 3A, 3B and 3C are explanatory diagrams showing an example of differential processing from the left in the image processing module 312, etc. of the input unit shown in FIG. 1. FIG. 3A shows an example of the window which is cut on the character's line in the vertical direction, in which the hatched portion represents the character's line. FIG. 3B shows the differential value with respect to the line with an asterisk in X direction when differential processing from the left is performed in this window. FIG. 3C shows the sum total of these differential values "1", "2", "3", "4" and "5", which is the output value of the input unit. As shown in FIG. 3C, a value obtained by adding differential values in the differential direction in such a manner in the window is obtained for each line, and the mean value thereof is adopted as the output of that window. Further, for a window where the type of image processing is density sum, the mean is obtained by adding up the densities of all the picture elements in the window and dividing that value by the number of picture elements. This means value is adopted as the output of the window. Moreover, in image processing in a window region, it is possible to obtain an output value of the input unit independent of the size of the window by normalizing the value of image processing result with the size of the window.

The output values of these input units 31, 32 and 33 are connected to one of feature units 41, 42 and 43, respectively. In these feature units, an output y given by a sigmoid function shown in the following expression is obtained with feature units calculation modules 412, 422 and 432 against a value z obtained by adding thresholds stored in threshold storages 411, 421, and 431 to the output values of these input units. Here, T is a constant.

$$y = 1/(1+e\text{-}z/T) \quad (1)$$

For the output values of these respective feature units 41, 42 and 43, weights are stored in the weights storage 5 for each of the output units 61, 62 and 63, and in respective output units, values obtained by multiplying output values $Y1j$ of the feature units by the weights $W1,k,j$ as shown in the following expression (2) are added up, and outputs $O_k$ given by a sigmoid function shown in the following expression (3) is obtained in the output units calculation modules 612, 622 and 623 against a value z obtained by adding output thresholds that are stored in output threshold storages 611, 621 and 631 to the values z/2,k. Here, T is a constant.

$$Z_{2,k} = \sum_{j=1}^{2n} w_{1,j,k} \times y_{1,j} \quad (2)$$

$$O_k = 1/(1 + e - z/T) \quad (3)$$

Respective output units exist corresponding to the types of characters, and the character corresponding to the output unit which has shown the maximal output value is adopted as the result of judgement.

Figure 4:
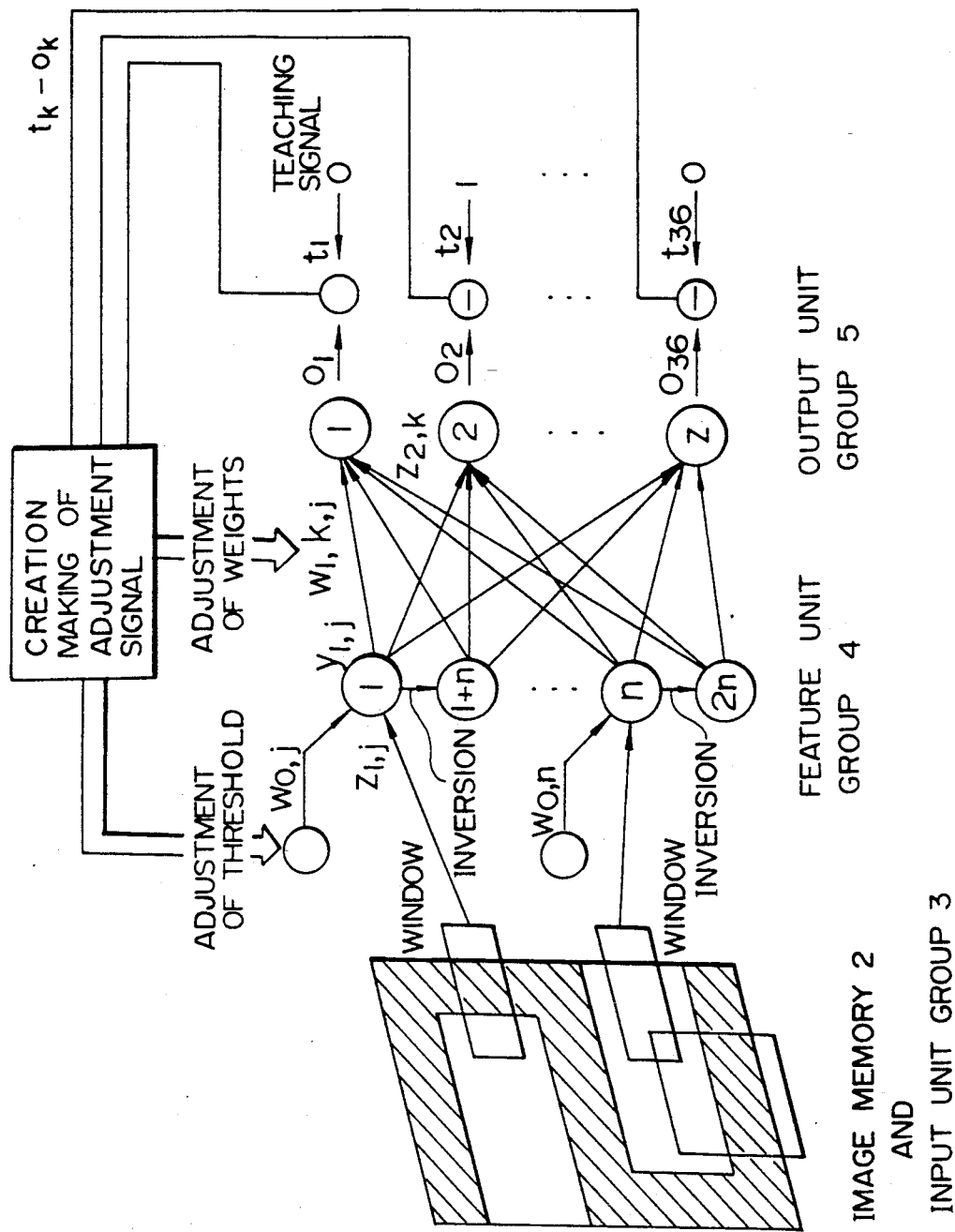
FIG. 4 is an explanatory diagram showing a process of adjusting thresholds and weights shown in FIG. 1.

Next, means for adjusting the thresholds of the feature units 41, 42 and 43 and the output units 61, 62 and 63 and the weights of the weight storage 5 using the results of character recognition will be explained. FIG. 4 is an explanatory diagram showing a process of adjusting the thresholds of the feature units and the output units and adjusting the weights. The output values of an inversion feature units in FIG. 4 are calculated with an expression (6). As shown in FIG. 4, adjustment of the thresholds and the weights is made in such a manner that, by feeding a teaching signal to the output units, respectively, the weight $W1,j,k$ between the feature units of the feature unit group 4 and the output units of the output unit group 6 are corrected, and then the thresholds $W_{o,j}$ between the input units of the input unit group 3 and the feature units of the feature unit group 4 is corrected. The teaching signal is an ideal value for the outputs of respective output units, and 1 is given to the output unit which corresponds to a character of correct interpretation, and O is given to other output units. FIG. 4 shows an example of case when the thresholds and the weights are adjusted with respect to a numeral 2. Since the correct interpretation is a numeral 2, the teaching signal given 1 to the output unit corresponding to the numeral 2 and gives O to other output units. Such correct on can be made by a method known as the back-propagation method shown in the following expressions in which the difference between each output unit and the teaching signal corresponding thereto is obtained and adjusting signals )66 wo,j and are $\Delta w1,k,j$ created. Here, C is a constant.

$$\Delta w1,k,j = (tk - ok)f'(z2,k) \cdot Y1,j \quad (4)$$

$$\Delta wo,j = Ckw1,j,k(tk - ok)f'(z1,k)f'(z1,j) \quad (5)$$

In above described adjustment of the thresholds and the weights of the feature units and the output units, the trial number of times required for adjustment depends on whether the initial value of the weight is close to the result of adjustment or not. In the present character recognition equipment 10, it is possible for a user to set the initial value of the weight through the user's judgement. FIG. 5 is an explanatory view showing a screen with which a user sets the initial value of the weights in FIG. 4 through the user's judgement. This is a chart screen having the types of characters and the types of input units longitudinally and latitudinally. In this chart screen, the user sets O when a character's line exists in the window region of each input unit and sets X when it does not exist. When the existence of the character's line is not clear, neither O nor X is set. When the user makes a setting in such a manner, the character recognition equipment 10 initializes the weight of the output unit corresponding to the character designated as O and the feature unit connected to the input unit at "+1", the weight for that which is designated as X at "−1", and the weight for that which is designated neither O nor X at "0", respectively as the initial values of the weights. By doing so, the trial number of times for adjustment may be reduced lower than the case when the weights are determined at random.

Figure 7:
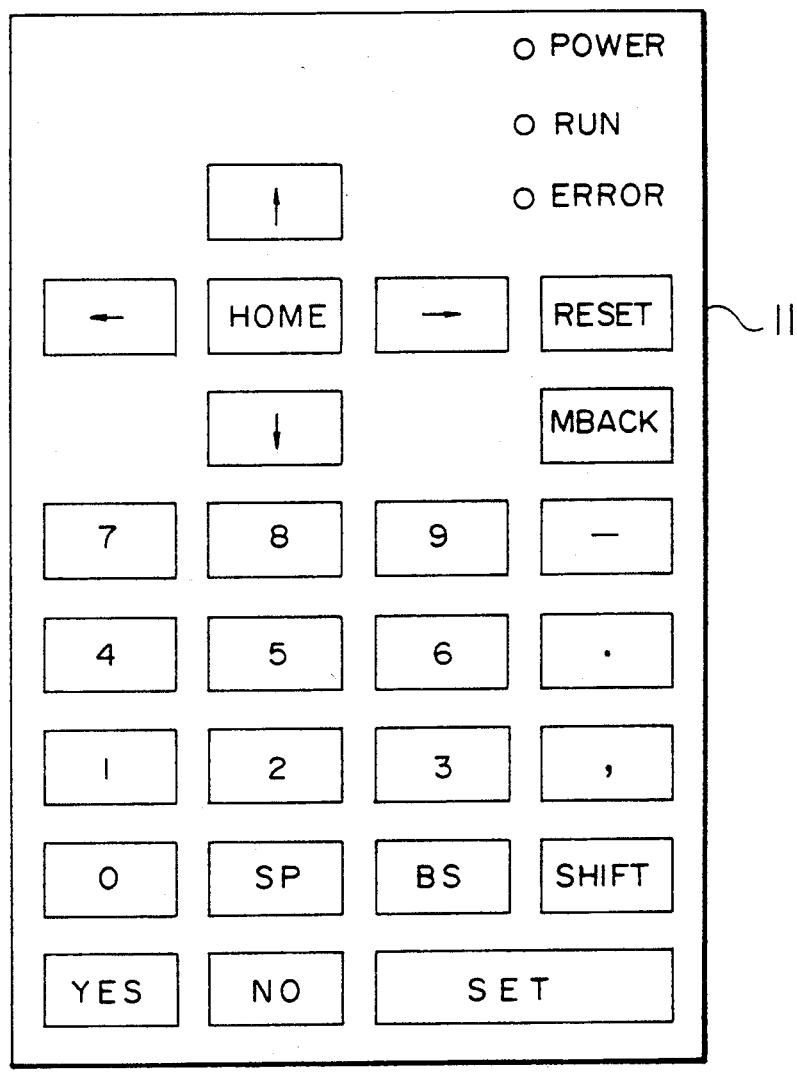
FIG. 7 is a top view showing an example of a keyboard used in the operation of FIG. 6.

Next, a method of setting positions and sizes of window regions 201, 202 and 203 of the input units 31, 32 and 33 will be explained. The position of the window region is expressed, by assuming a character region, with the origin of the outer frame of the character region. For this purpose, the outer frame of the character is designated first, and then, the window region is designated. The outer frame and the window region and each window region are affixed with numbers, and setting is started by designating these numbers. FIG. 6 is an explanatory view showing a screen for setting the positions and the sizes of the window regions of the input units shown in FIG. 1. Also, FIG. 7 is a top view showing an example of a keyboard 11 used for the operation in FIG. 6. Here, the number of the outer frame of the character is determined as "0", and the numbers of respective window regions 1, . . . 9, A, . . . Z are assigned. Since a raw image is always displayed on this screen, it is possible to set the window regions while looking at the character to be registered. Number strings being arranged in the lower part of the screen, number designation of the window regions is made by pressing the SET key after moving a cursor to the position of the number to be designated with a crosswide feed cursor key of the keyboard 11. The outer frame of the character is set in the first place. Since the movement of the outer frame of the character can be performed vertically and horizontally by means of the cursor key under such a state that the character outer frame, viz., the number "0" has been selected, the position of the character outer frame is set to an appropriate position. Setting of the window region is performed by selecting the number of the window region with the cursor under the above-described state. Further, when the size of the character outer frame is set or altered, since a cross cursor is displayed under the state that the character outer frame has been selected, a point in the upper left part of the character outer frame is set first, and then, a point in the right lower part is determined. Here, when the point in the right lower part of the character outer frame is being moved, a value representing the X and Y position of the cursor expressed in a coordinate with the left upper part of the character outer frame as the origin is displayed. Thus, precise position setting is possible. Next, setting of respective window regions is started by designating the numbers of the window regions. Since a cursor is displayed in the scope for setting the position of this window region, the position is designated while moving the cursor with the cursor key. As a value representing the X and Y position of the cursor in a coordinate with the upper left part of the character outer frame as the origin is displayed at that time, precise position setting is possible. Since the window region can be expressed with a parallelogram, three points, in left upper, left lower and right lower parts are designated for positional designation. At least one pair of sides of this parallelogram have to be always horizontal or vertical at all times. If these conditions are not met, an error is generated and the state of designating the window region is produced again.

After above-mentioned position and size of said window region have been set, the type of image processing performed by image processing modules 312, 322 and 332 of the input units in the window regions 201, 202 and 203 is set in the next place. FIG. 8 is an explanatory view showing a screen for setting the type of image processing in the image processing modules shown in FIG. 1. Such setting is made by selecting the type of image processing in a menu scope such as shown in FIG. 8. In this example, five types, that is differential from the left of the character's line in the longitudinal direction, differential from the right thereof, differential from the top of the character's line in the horizontal direction, differential from the bottom thereof, and the density sum of the whole, may be selected. The results of such selection are stored in the image processing modules 312, 322 and 332 of the input units 31, 32 and 33, and selected image processing is performed in character recognition. The differential processing described here is effectual when the brightness of the image is not uniform or when the contrast is poor.

Figures 9A, 9B:
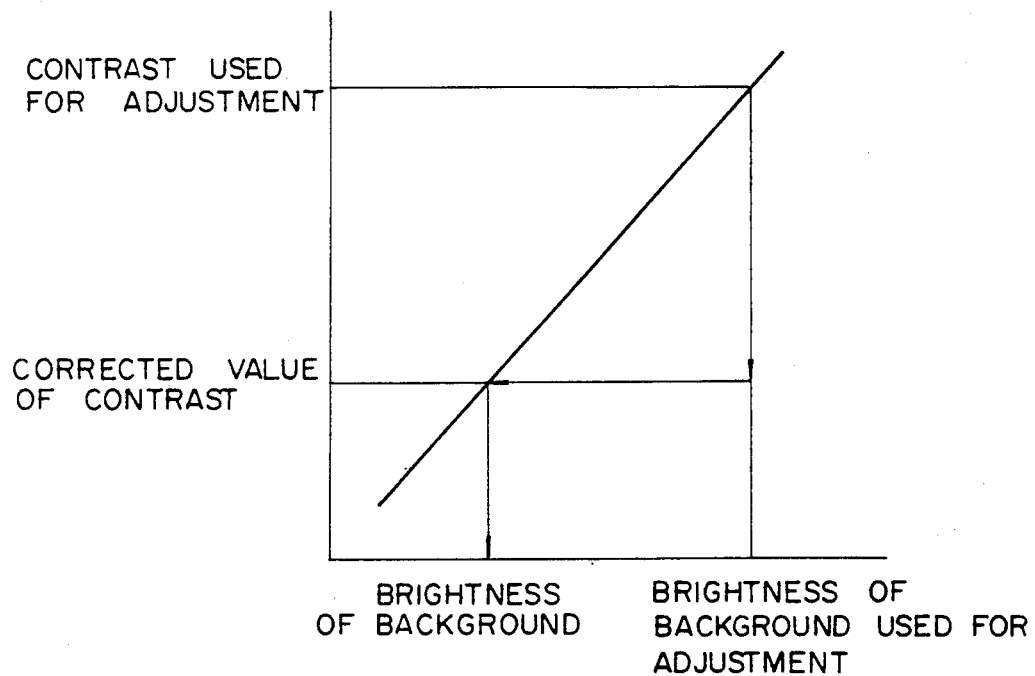
FIGS. 9A and 9B are explanatory diagrams showing how to compensate the brightness of the image of FIG. 1.

Next, brightness correction of an image will be explained in conjunction with FIGS. 9A and 9B. FIGS. 9A and 9B are explanatory diagrams showing a method of correcting the brightness of the image in FIG. 1. In general, if the brightness of lighting is different for a same sample, both the density of the image and the differential value of the image are varied. In the present character recognition equipment 10, the brightness is compensated in the input units 31, 32 and 33 with a relational expression shown in FIG. 9A in order to eliminate the effects by such variation of lighting. In this processing, the density value of the background and the density value of the character's line are preserved against the image of the character which was used previously in adjusting the thresholds and the weights of the feature units and the output units in FIG. 4, and the density value of the image and the differential value of the image at the time of recognition are compensated using these values. FIG. 9B is a relational diagram showing experimental results that are effectual reasons for the brightness compensation method shown in FIG. 9A. In FIG. 9B, the relationship between the density value (brightness) of the background and the density value (contrast) of the background and the character's line has been investigated for the same character in which the brightness of lighting is varied. Since this result shows that both are almost in proportion to each other, it is possible to make compensation assuming the density of the image and the differential value of the image under lighting conditions at the time of adjustment by compensating the density of the image and the differential value of the image at the time of recognition with the relational expression shown in FIG. 9A.

Figure 10:
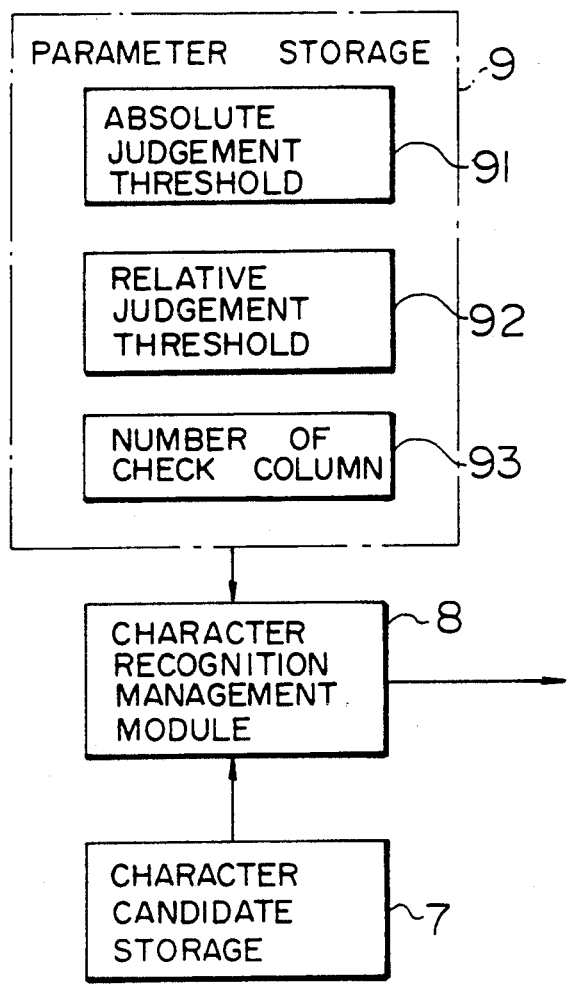
FIG. 10 is another partial block diagram of a character judgement module showing an embodiment of a character recognition equipment according to the present invention.

Next, a method of improving a recognition factor when a character string consisting of a plurality of characters is recognized is explained with reference to FIG. 10. FIG. 10 is another partial block diagram of a character judgement module showing an embodiment of a character recognition equipment according to the present invention. In FIG. 10, the character judgement module 1 of this character recognition equipment 10 is provided with a character candidate storage 7, a character recognition management module 8 and a parameter storage 9 in addition to the fundamental elements shown in FIG. 1. Further, in the parameter storage 9, an absolute judgement threshold storage 91, a relative judgement threshold storage 92 and a number of check column storage 93 are provided. The character candidate storage 7 and parameter storage 9 are located in the program and data memory 15 shown in FIG. 2. The character recognizing management module 8 is implemented by the CPU 20. Now, when a character string consisting of a plurality of character strings is recognized, the characters which may be provided in each column can be limited sometimes in product numbers and the like. For example, in case the first character string (the character in the first column) shows a year, the same character string will appear unless the year changes, and there are several types of the usable characters even when a range of several years is considered. When usable character candidates are designated for each column in this case, they are stored in the character candidate storage 7 of the character judgement module 1 of the character recognition equipment 10 composed as described above. The character recognition management module 8 checks the character candidates stored in the character candidate storage 7 for each column, and performs calculation only with respect to the output units 61, 62 and 63 which correspond to character candidates which are designated therein. Then, the character corresponding to the output unit which provides the maximal value among the output units for which calculation has been performed is adopted. By doing so, even in case there are both "I" and a similar character such as "1" for instance, correct judgement as "1" can be made if it is designated that that column can take a numeral only. Besides, when such a promise is made that all of alphanumeric characters are to be adopted as character candidates for columns in which character candidates are not designated, a user who thinks designation of character candidates is complicated may omit such designation.

Next, providing the weights for the purpose of improving the recognition factor when a character string consisting of a plurality of characters is recognized will be explained. In a product number consisting of a plurality of character strings for instance, the character usable in each column may be limited sometimes. Therefore, in FIG. 10, a method in which character candidates which may be used in a column are stored in the character candidate storage 7 shown in FIG. 10 for each column and processing calculation for recognition judgement is executed only on the stored character candidates has been explained. Two systems may be considered as the system of the weights for the above-described purpose. In one system the thresholds and the weights are different for each column corresponding to the character candidate, and in the other system the thresholds and the weights are common to all columns. First of all, the adjusting method and the effect in the system using the thresholds and the weights that are different for each column corresponding to the character candidate will be explained. The types of characters used for respective columns are stored in the character candidate storage 7 shown in FIG. 10. If the types of usable characters of each column are few at that time, the recognition factor of that column is improved. Only two to three types of usable characters are sufficient for some columns which, for example, express the year, while other columns may make use of all the characters. Therefore, when the column number in which adjustment is made in case of adjustment of the threshold and the weights is designated and adjustment is made on the stored character candidates only while referring to character candidates usable for that column from the character candidate storage 7, it is possible to obtain the thresholds and the weights that are optimum for a column having different usable character candidates. As the result, the recognition factor is improved and the misrecognition factor is lowered, thus making it possible to improve the recognition accuracy greatly. Further, when the usable character candidates stored in the character candidate storage 7 are as small as one to two types in number, it is possible to inspect the printing quality of the characters by checking the value of the degree of confidence on those characters. Next, the adjusting method and the effects of the system in which common thresholds and weights are used for all the columns will be explained. When the thresholds and the weights that are intended to be optimized for each columns as described above are used, the recognition accuracy is greatly improved, but there are some cases when the thresholds and the weights need not be adjusted for each column having different usable character candidates. In this case, the character judgement module 1 calculates the degree of confidence on all the characters by using the thresholds and the weights that are common to all the columns, and makes only the usable character candidates stored in the character candidate storage 7 the object of recognition judgement based on the result of the calculation. That is, judgement of one character is made by referring to only the value of the degree of confidence of the output unit corresponding to the usable character candidates stored in the character candidate storage 7. In this system, it is possible to reduce the storage quantity of the thresholds and the weights, thus providing an effect that adjustment may be executed at a high speed.

Next, a method of determining whether the character recognition has been completed or not will be explained. The present character recognition equipment 10 recognizes the input character as the character which corresponds to the output unit which has taken the maximum value. Here, since the value of the output unit shows the degree of confidence regarding that character, there is a possibility that the recognition is an error when the value is small even if the maximum output unit value has been obtained. Therefore, a user can set an absolute judgement threshold and output a result of wrong recognition when the maximum value of the output unit is at the absolute judgement threshold or below. In order to implement such a function, in the present character recognition equipment 10, the absolute judgement threshold designated by the user is stored in an absolute judgement threshold storage 91 provided in the parameter storage 9 shown in FIG. 10, and the character recognition management module 8 confirms that the maximum value of the output unit is at this absolute judgement threshold or above after the calculation in the output unit is completed and outputs a result of wrong recognition when said maximum value is at the absolute judgement threshold or below. Further, when the maximum value of the output unit is close to the second value, it is difficult to judge which output unit of the maximum value or the second highest value the character corresponds to. Thus, the user may set a relative judgement threshold, and output the result of wrong recognition when the difference between the maximum value of the output unit and the second highest value is at the relative judgement threshold or below even if the maximum value of the output unit exceeds the absolute judgement threshold. In order to implement this function, in the present character recognition equipment, the relative judgement thresholds designated by the user are stored in a relative judgement threshold storage 92 provided in the parameter storage 9 shown in FIG. 10, the character recognition management module 8 obtains the difference between the maximum value and the second highest value of the output unit after calculation of the output unit is completed, it is confirmed whether the difference value is at the relative judgement threshold or above, and the result of wrong recognition is output when the difference value is below the relative judgement threshold.

Figure 11:
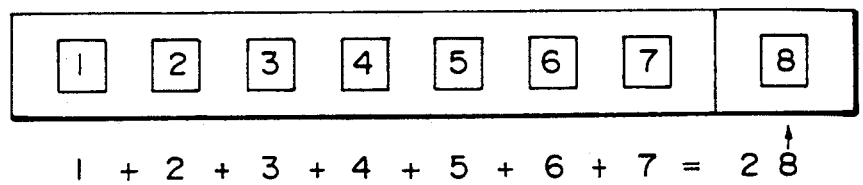
FIG. 11 is an explanatory diagram showing a method of reducing misrecognition in FIG. 10.
Figure 16:
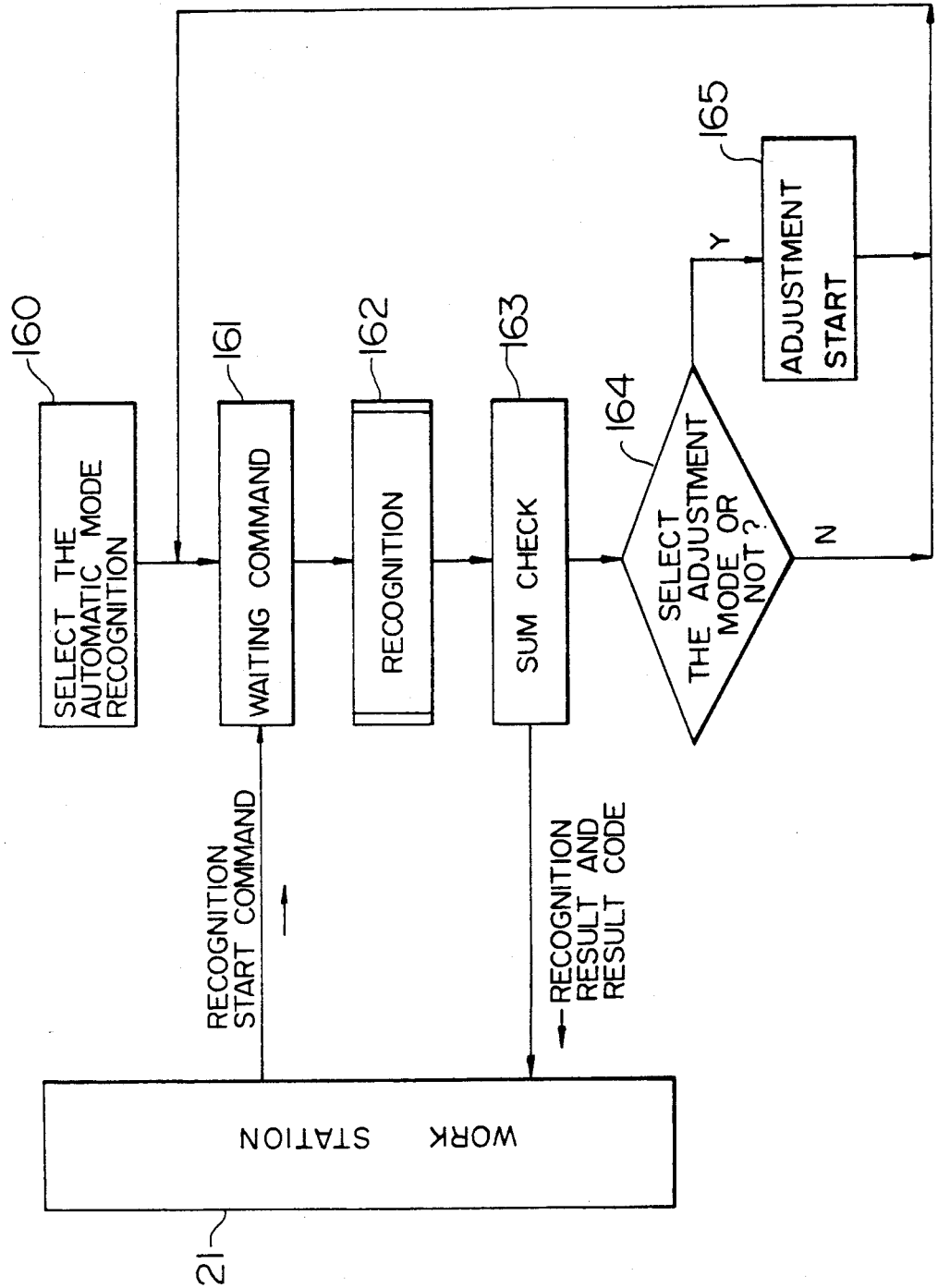
FIG. 16 is a flow chart showing a sequence in automatic recognition mode of a character recognition equipment of the present invention.
Figure 17:
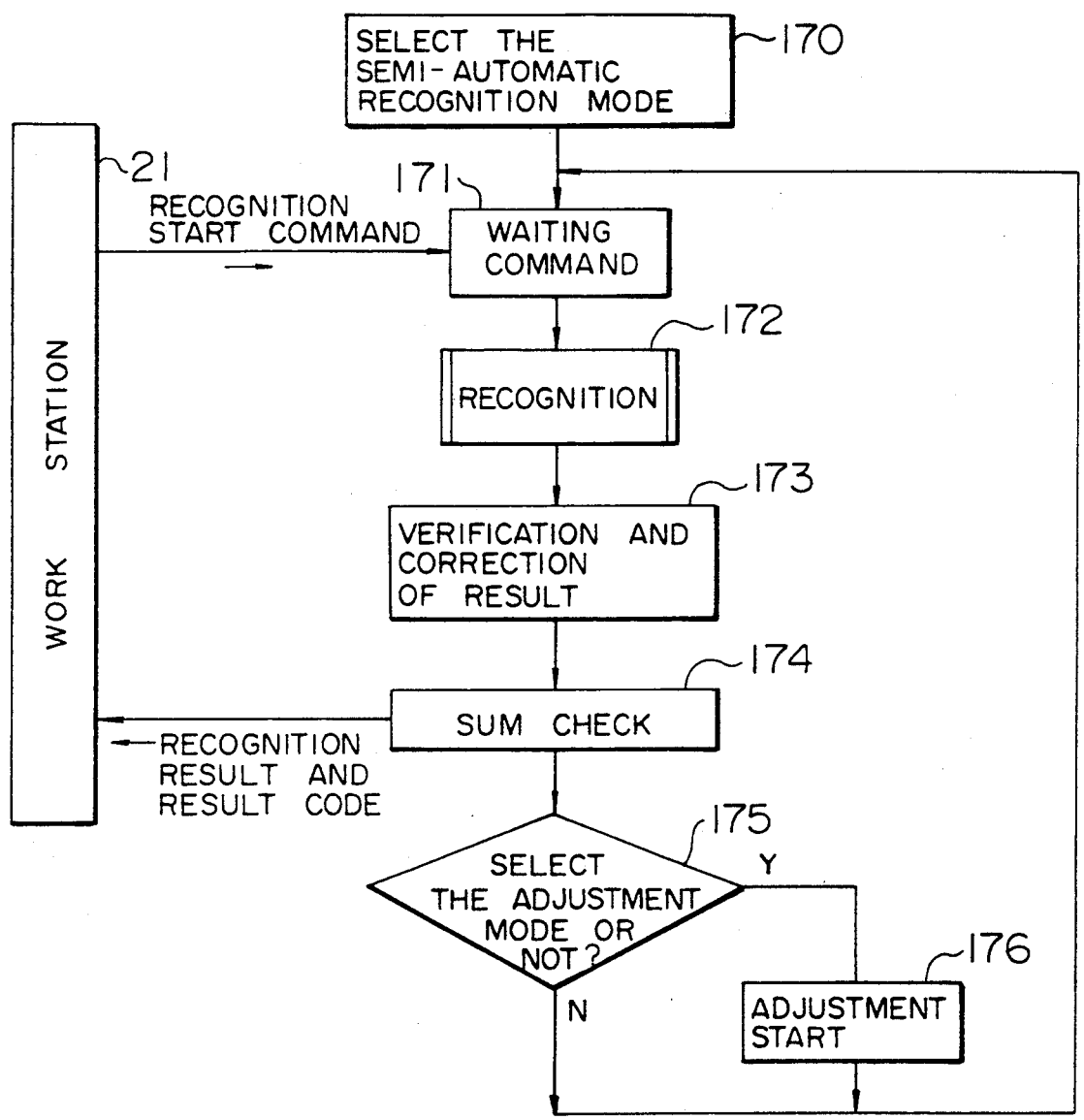
FIG. 17 is a flow chart showing a sequence in semiautomatic recognition mode thereof.

Next, a method called sum check which reduces misrecognition when a character string having a predetermined number of characters is recognized will be explained. FIG. 11 is an explanatory diagram showing a method of reducing misrecognition of the character judgement module 1 of the character recognition equipment 10 shown in FIG. 10. Using this method called sum check when there is a number composed of seven columns as shown in FIG. 11, the sum of seven numerals in the first column through the seventh column is obtained, the last digit is printed in the eighth column as a check digit, and the character recognition equipment recognizes the digit as the number in eight columns and collates the result of recognition. In the case of FIG. 11, the product number is "1 2 3 4 5 6 7", and the sum thereof is 28. Therefore, 8 is printed in the eighth column, and the character recognition equipment recognizes the product number as "1 2 3 4 5 6 7". The values in the first column thru the seventh column are added in the character recognition equipment after recognizing the number as described above, and it is checked whether the last digit coincides with the value in the eighth column so as to judge the consistency. This sum check is performed after recognition of respective characters are completely finished as shown in FIG. 16 and FIG. 17 which are shown later.

Such sum check is performed in some cases and is not performed in other cases, and the number of columns used for the check is not constant even when the sum check is performed. Therefore, a menu screen as shown in FIG. 12 is used so that the user inputs this number of columns. FIG. 12 is an explanatory view showing a scope for setting the number of columns when the method of sum check is employed for reducing misrecognition of the character judgement module of the character recognition equipment shown in FIG. 11. Here, it means that no checking is performed when the column number which is input by the user is "0", and "1" means that the last one character is used for checking. The number of the check columns designated here is stored in a check storage 93 provided in the parameter storage 9 shown in FIG. 10, and the character recognition management module 8 takes out the number of check columns therefrom and performs checking after recognition of all characters is completed.

Figure 13:
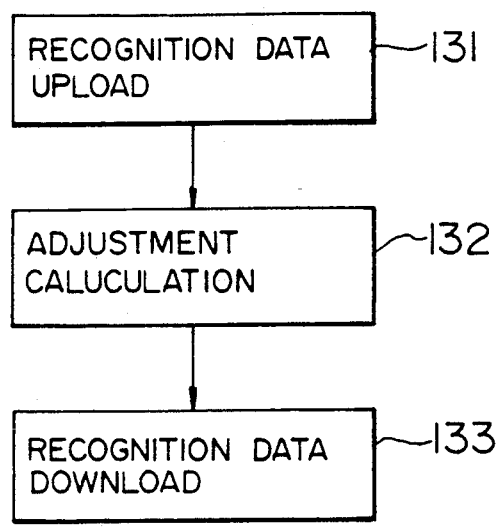
FIG. 13 is a flow chart showing a process of adjusting thresholds and weights of FIG. 1 by using a computer other than the character recognition equipment.

Next, a method of adjusting the thresholds of the feature units 41, 42 and 43 and the output units 61, 62 and 63 and the weights of the weight storage 5 by using a computer other than the character recognition equipment 10 will be explained. Since adjustment of these thresholds and weights takes long processing time, it is better sometimes to perform such adjustment not by the character recognition equipment itself but by a computer having a high processing capacity. FIG. 13 is a flow chart showing a process in which adjustment of the thresholds of the feature units and the output units in FIG. 1 is made by employing a computer other than the character recognition equipment. On this computer, there are provided a program for adjusting the thresholds and the weights as explained in conjunction with FIG. 4 previously and a program which up-loads teaching data and image data such as the number of characters stored in the parameter storage 9 shown in FIG. 10 and down-loads the results of adjustment of the thresholds and the weights, and adjustment of the thresholds and the weights may be executed in accordance with these programs. In the learning using a separate computer, recognition data of teaching data and recognition data stored in the parameter storage 9 in FIG. 10 from the character recognition equipment 10 are up-loaded to the computer (step 131). Then the thresholds and the weights are adjusted using the teaching data and character image data. Since parameters such as character numbers and character candidates for each column have been up-loaded, adjustment calculation of optimum thresholds and weights is performed to these parameters (step 132). When the learning is completed, the result of the adjustment is down-loaded to the character recognition equipment 10. Since the data of a plurality of results of adjustment can be saved on the computer as a file, it is possible to down-load appropriate recognition data results (step 133).

Figure 14:
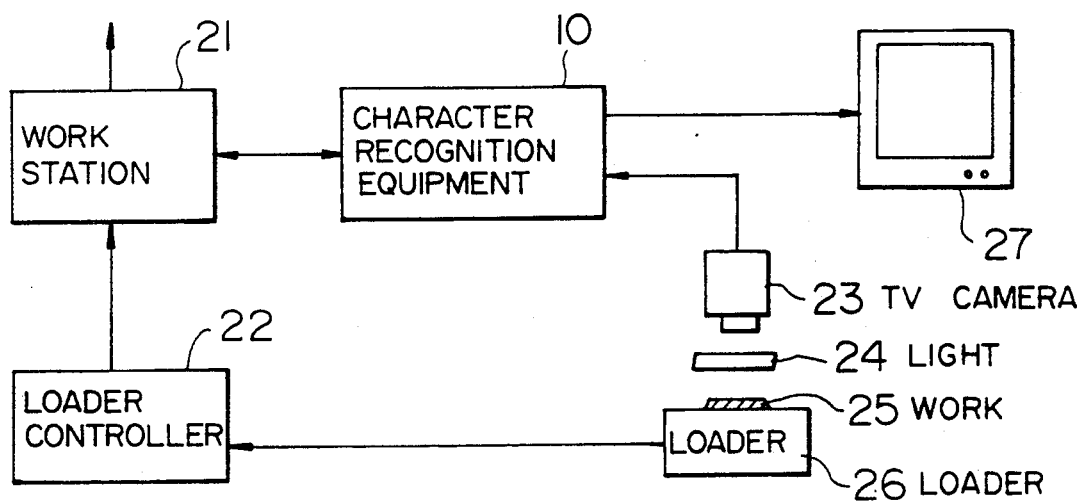
FIG. 14 is a system block diagram showing an example in which a character recognition equipment of the present invention is employed in a production line.

Next, an operation mode in which the present character recognition equipment 10 is executed will be explained. FIG. 14 is a system block diagram showing an example when the character recognition equipment 10 of the present invention is used along with other equipments in a production line. In FIG. 14, this system is provided with the present character recognition equipment 10, a work station 21, a loader controller 22, a TV camera 23, a lighting source 24, a work 25, a loader 26 and a monitor TV 27, and recognizes a product number printed on the surface of the work 25 by a command for recognition start from the work station 21 connected to the present character recognition equipment 10. This character of the recognition object has a very poor printing quality which is liable to produce breaking and thinning of a character's line such as a stamped character on a metallic surface and a laser marking character on a ceramic surface. The product number also has markers printed for positional segmentation at the head and the tail thereof.

Figure 15:
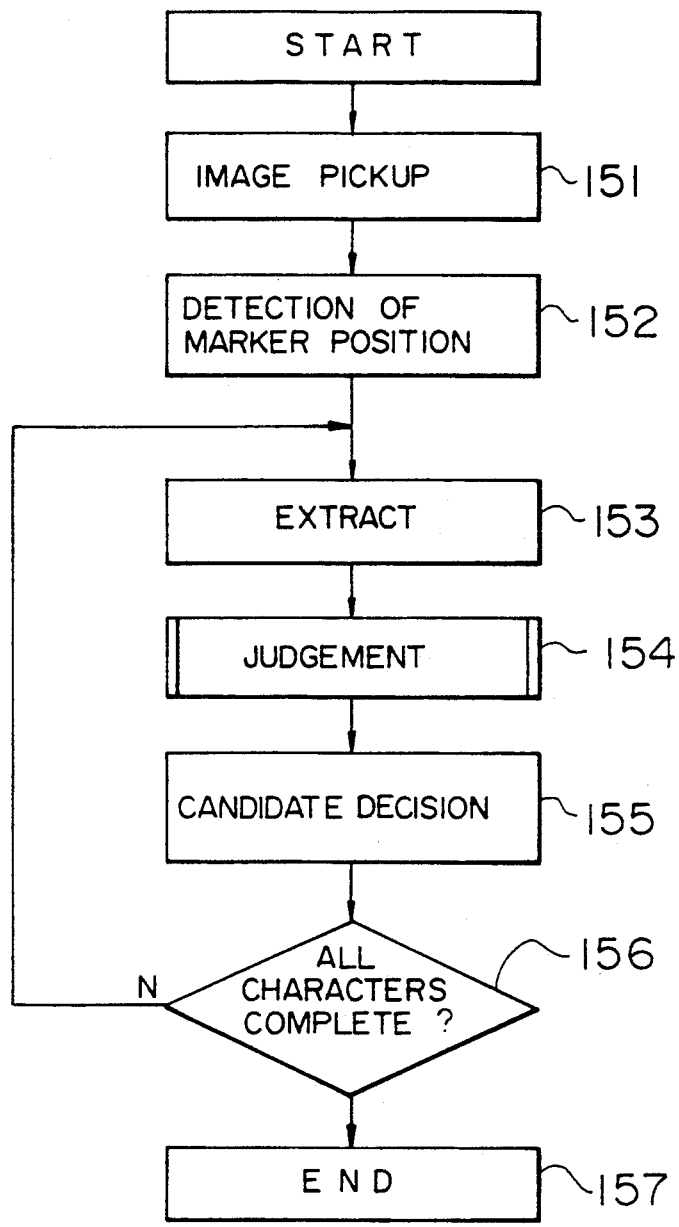
FIG. 15 is a flow chart showing a read process of a product number shown in FIG. 14.

FIG. 15 is a flow chart showing a read process of the product number of the work 25 within the character recognition equipment 10 shown in FIG. 14. This flow for the product number is common to any operation mode of recognition among manual recognition, semiautomatic recognition and automatic recognition. This processing program is stored in the program and data memory 15 in FIG. 2. First, after receiving a recognition start command from the external work station 21 shown in FIG. 14 through the general interface 14 shown in FIG. 2, an image of the product number printed on the surface of the work 25 which is located already within the visual field of the TV camera 23 is picked up by using the video interface 13 thereby to bring it into the image memory 2 (step 151). Then, the character position is detected after detecting the marker positions, and recognition is performed character by character. The detection of the marker positions is executed in such a manner that windows are set around two markers, respectively, and the center positions of projection distribution of the density in these windows is determined (step 152). Next, when the marker position are detected, the distance between these markers is calculated. Since the distance between these markers is known in advance, it may be judged whether the markers could be detected correctly or not by comparing the distance with the result of calculation. That is, if this distance differs much from the specified value, it is judged that the markers could not be detected correctly, and character recognition is suspended. Also, when the marker positions could not be detected correctly, one character is segmented in accordance with the relative relationship between the marker positions and the character position. This relative relationship is taught by using an actual object at the time of teaching the relationship among the character pitch, the character position and the marker positions (step 153). Then, judgement processing is performed on every segmented character (step 154), and the character candidate is determined (step 155). Lastly, it is judged whether all characters have been completed (step 156), and processing is terminated if all characters are completed.

First, the operation of the automatic recognition mode will be explained. The loader 26 which is controlled by the loader controller 22 positions the work 25 on which the product number is printed so that it enters into the visual field of the TV camera 23, and informs the work station 21 of the completion of loading. This work which entered into the visual field is illuminated uniformly by the lighting source 24. Also, the work station 21 which was informed of the completion of loading commands recognition start to the character recognition equipment 10, and the character recognition equipment 10 which receives this command picks up the image of the recognition object with the TV camera 23 and takes the image into the image memory 2. Then, the character recognition equipment 10 executes recognition of the character with respect to the picked-up image, and transmits the result to the work station 21. The work station 21 transfers the result further to a host computer after receiving the recognition result, whereby completing the first recognition. FIG. 16 is a flow diagram showing the sequence in the automatic recognition mode of the character recognition equipment 10 shown in FIG. 14 (FIG. 2). First, when this automatic recognition mode is selected (step 160), the character recognition equipment 10 is under a command waiting state for the recognition command from the work station 21 (step 161), and the character recognition equipment 10 which receives a command signal for recognition start from the work station 21 executes recognition and transmits a result code to the work station 21 along the with recognition result (step 162). If it is designated to perform sum check at this time, this sum check is performed, and if mismatching is found in the recognition result through sum check, a sum check error code is set in the result code (step 163). Lastly, it is judged whether adjustment of above-mentioned thresholds and weights is designated using a character image picked up at this time (step 164), and adjustment is started if adjustment has been designated (step 165).

Figure 18:
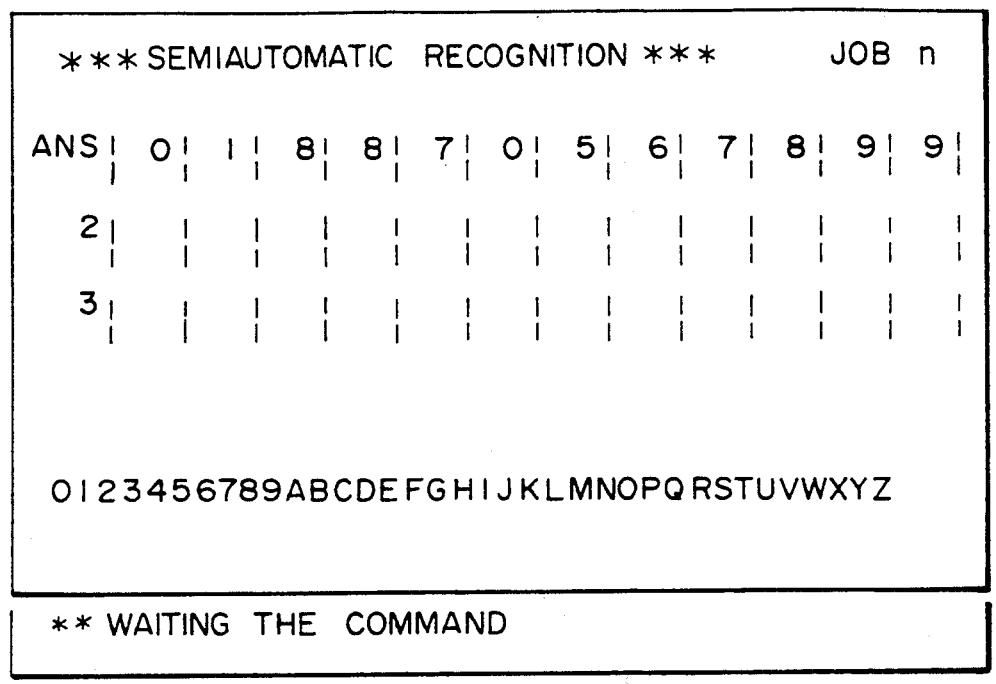
FIG. 18 is an explanatory view showing a display scope of the recognition result in FIG. 17.
Figure 20:
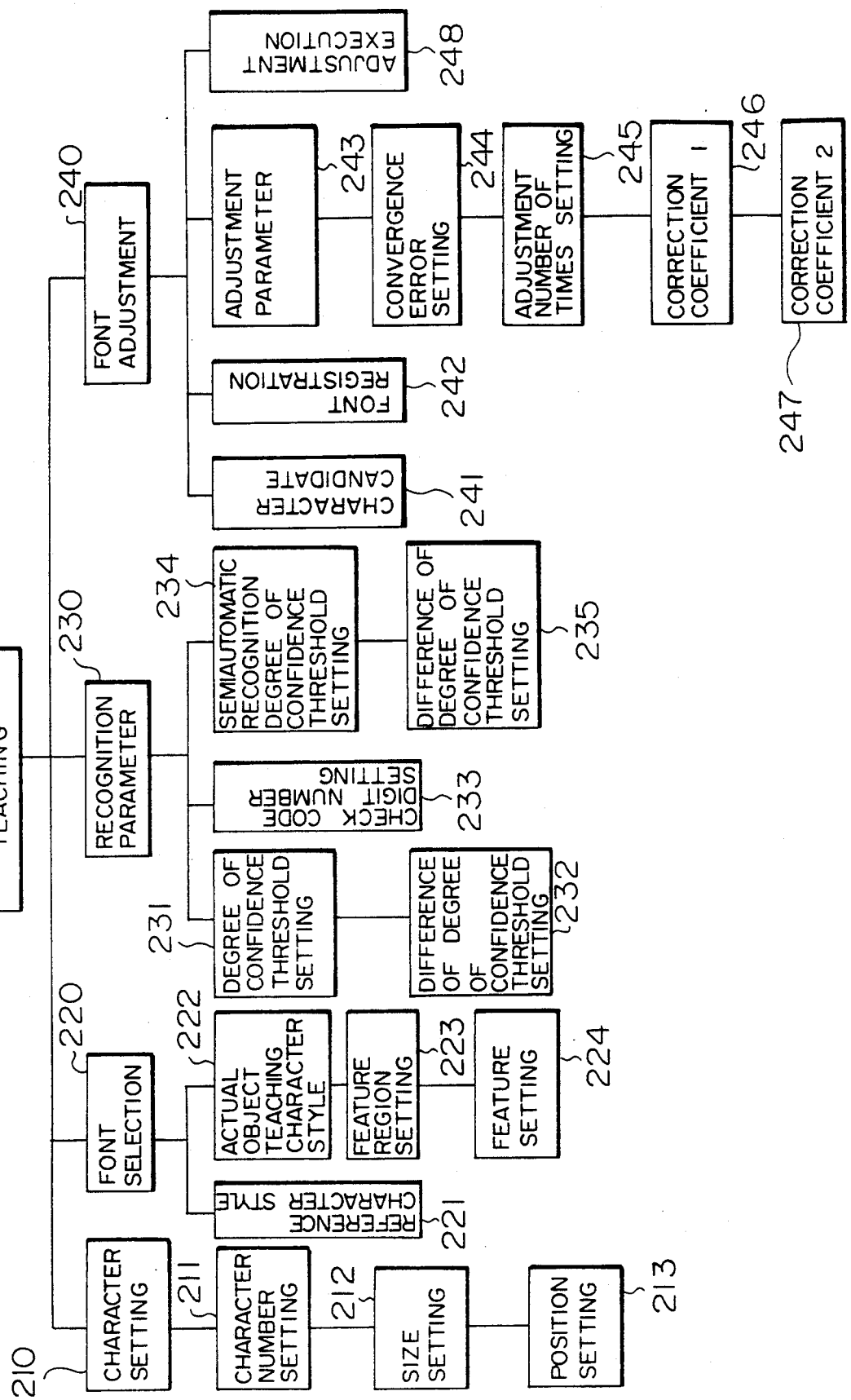
FIG. 20 is a block diagram showing a function in teaching mode of a character recognition equipment according to the present invention.

Next, the operation of the semiautomatic mode will be explained. In the semiautomatic mode, it is possible to ask the user to confirm the result before the recognition result is returned to a host equipment, and to correct the result on the spot in an interactive manner when the result is in error. Since it is complicated to always ask the user for confirmation, it is possible to ask the user for confirmation only when the degree of confidence on recognition is low. The user can set this semiautomatic degree of confidence threshold in the same manner as a function 234 in FIG. 20 shown later. FIG. 17 is a flow diagram showing the sequence of the semiautomatic recognition mode of the character recognition equipment 10 shown in FIG. 14 (FIG. 2). When this semiautomatic recognition mode is selected (step 170), a control state by communication from the work station 21 is produced similarly to above said automatic recognition mode so as to be put under a command waiting state for recognition command (step 171), and the character recognition equipment 10 which receives the command signal of recognition start from the work station 21 executes recognition (step 172). The recognition result of this semiautomatic recognition mode is displayed in a similar form to the screen of manual recognition result as shown in FIG. 18. FIG. 18 is an explanatory view showing a display screen of the recognition result in the semiautomatic recognition mode of the character recognition equipment 10 shown in FIG. 14 (FIG. 2). When the degree of confidence on the recognition result obtained here is lower than the designated semiautomatic degree of confidence threshold, the user is asked for confirmation of the recognition result before the recognition result is returned to the work station 21. When the recognition result is correct in this case, the result is returned by pushing a key which has a transmission function. When the recognition result is wrong, the cursor is moved to the position of the erroneously recognized character with a cursor crosswise shifting key (~ +), and the cursor is moved to the position of the correct character among alphanumeric characters displayed in the lower part of the scope for correction. Here, when there are two or more characters which are mis-recognized, the cursor is shifted to the positions of erroneously recognized characters and the recognition result is corrected in a similar manner as above, and the recognition result and the result code are transmitted to the work station 21 when the user has confirmed all the recognition results (step 173). If sum check is designated at this time, sum check is performed, and a sum check error code is set in the result code if mismatching is found in the recognition result through this sum check (step 174). Lastly, it is judged whether it is designated to adjust the thresholds and the weights using the character image picked up that time (step 175), and adjustment processing is performed if such designation has been made (step 176).

Figure 19:
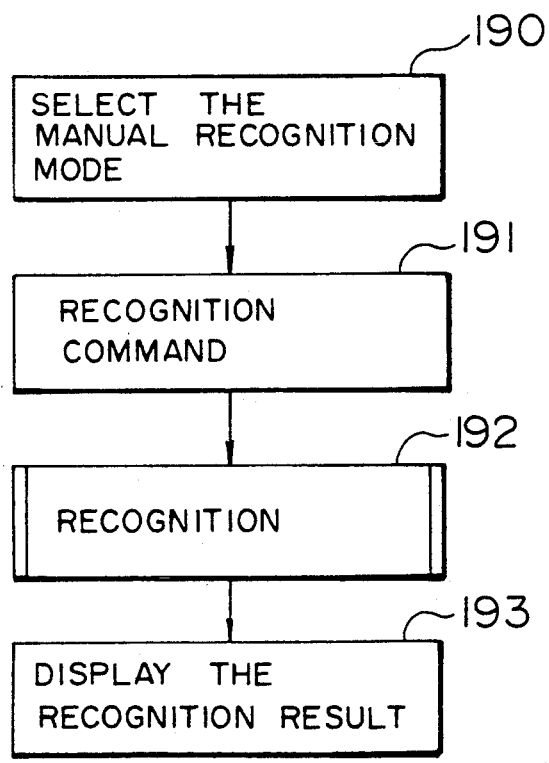
FIG. 19 is a flow chart showing a sequence in manual recognition mode of a character recognition equipment according to the present invention.

Next, the operation in the manual recognition mode will be explained. FIG. 19 is a flow diagram showing the sequence of the manual recognition mode of the character recognition equipment 10 shown in FIG. 14 (FIG. 2). This manual recognition mode is for executing recognition in order to judge whether correct recognition can be made with the thresholds and the weights of the feature units 41, 42 and 43 and the output units 61, 62 and 63 that are adjusted in teaching before performing automatic recognition. First, when the manual recognition mode is selected (step 190), the command for recognition start is given not from the work station 21, but by the operation from the teaching box 19 (step 191). With this, recognition is executed (step 192), the recognition result is displayed in the upper row of the scope, and the degree of confidence is displayed thereunder (step 193).

The character recognition equipment 10 may include, in addition to the automatic recognition mode in which recognition is started by the above-described recognition command from the work station 21 and the recognition result is transmitted to the work station 21, the semiautomatic recognition mode in which it is possible to start recognition by the recognition command from the work station 21 and to confirm and correct the recognition result, and the manual recognition mode for executing recognition with the data to which teaching was given and confirming the recognition result so as to judge recognition performance, a teaching mode for inputting characteristics of the recognition object such as a font, a window and a candidate character and a utility mode for performing image evaluation, operation of IC card input/output, setting of data transfer specifications for the work station, etc. and so forth, thus having five operational modes. The teaching mode and utility mode will be explained below.

FIG. 20 is a block diagram showing respective functions in the teaching mode of the character recognition equipment 10 shown in FIG. 14 (FIG. 2). When one type of TV camera 23 is used as a visual sensor, in a variety of environments, the teaching data must be set for every environment because the arrangement and the size of the character is different depending on the environment. Setting 210 related to a recognition object character string, font selection 220 of those characters, setting 230 of recognition parameters and adjustment 240 of the thresholds and the weights of the font taught in this teaching mode 200. First, as to the setting 210 for the recognition of an object character string, there are the setting of the number of the characters (211), the setting of the character size displayed with the number of picture elements (212) and the setting of the reference marker positions for segmenting the variation screen and position of a printing character string (213). Next, in the font selection 220, the character style of the recognition object character is designated. First, it is determined whether a reference character style 221 provided in the character recognition equipment 10 in advance such as OCR-A is adopted for the type of the font or an actual character pattern is registered. When this reference character style 221 is designated, the reference character style contained in advance is registered as the character style of the recognition object character. Also, when an actual object teaching character style 222 is designated, a feature region setting 223 such as setting of a window region suitable for judgement of the character style and a feature setting 224 are performed. Next, setting the recognition parameter,, there are provided degree of confidence threshold setting 231, digit number setting 233 of the check code and degree of confidence threshold setting 234 of semiautomatic recognition. In this degree of confidence threshold setting 231, there is threshold setting 232 of the difference in the degree of confidence. In the degree of confidence threshold setting 234 of semiautomatic recognition, there is threshold setting 235 of the difference in the degree of confidence.

Figure 21:
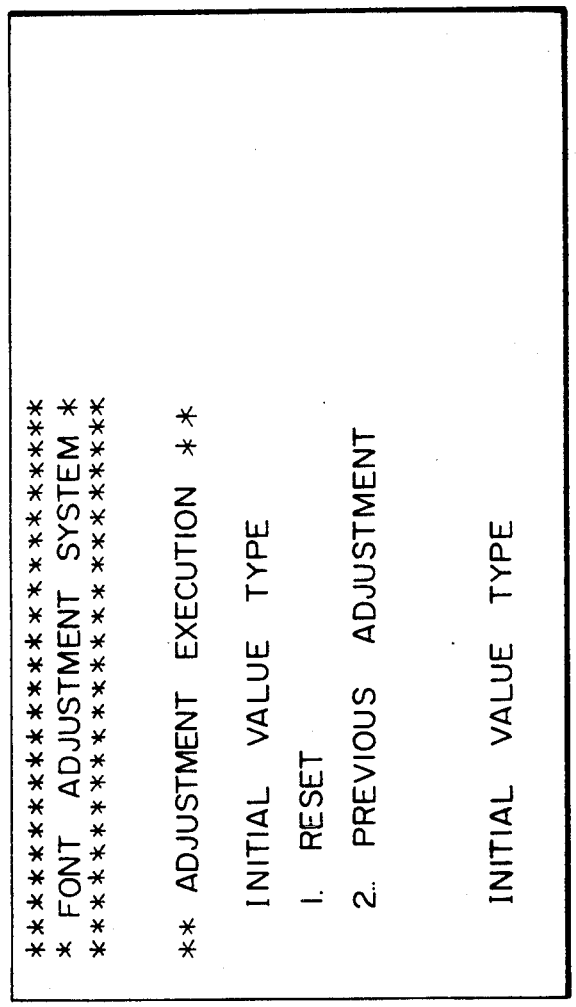
FIG. 21 is an explanatory view showing a selection scope of an initial state of adjustment execution in FIG. 20.

Next, in the adjustment 240 of the thresholds and the weights of the font, there are a setting 241 of the character candidates, character image registration 242 of the font used for adjustment, setting 243 of adjustment parameters and adjustment execution 248. In the character image registration 242 of the font, the outer frame is designated for every type of the character of the font and the image thereof is taken in, and adjustment of the thresholds and the weights is performed on this registered font. The image in the marker portion is taken in and reference brightness of the background is obtained first before inputting the character image, and then the character image is started to be taken in when the above is finished. When taking-in the character image, the type of the character is designated first and then the take-in operation of the image is performed. Even when this image is taken in, a raw image is displayed, and it is possible to take in the next character without a break. Since the character strings are arranged in the lower part of the screen, designation of the character type is performed by moving the cursor to the position of the character to be designated by means of the crosswise cursor key. When the character type is designated, a box showing the outer frame of the character is displayed at the center of the screen and the character image is input after moving this outer frame of the character to the position where the character is displayed by means of the cursor. The movement of the outer frame of the character may be performed by the cursor key under a state that the outer frame of the character has been selected. When setting 243 the adjustment parameters, four parameters, that is, the setting 244 of a least square error for judging convergence as an adjustment parameter, the setting 245 of the upper limit value of adjustment calculation number of times, the setting 246 of a coefficient ($0 \leq$ coefficient $\leq 1$) applied by the correction quantity of the result of adjustment calculation to the correction quantity at the present moment, and the setting 247 of a coefficient ($0 \leq$ coefficient $\leq 1$) applied by the correction quantity of the calculation result of last previous adjustment to the correction quantity at the present moment, are set. In adjustment execution 248, adjustment is executed practically using the data and the image which have been set so far. A selective screen appear for selecting whether adjustment is proceeded further with the adjustment result heretofore obtained as shown in FIG. 21 as initial values, or adjustment is started from new initial values obtained by resetting. FIG. 21 is an explanatory view showing a selective screen of the initial state of adjustment execution 248 shown in FIG. 20. When such selection is made, a graph showing the adjustment result is displayed. The axis of ordinates of the graph expresses an error of an evaluation function. The maximal value of the axis of ordinates 1.0, and is displayed at 1.0 when the error exceeds 1.0. The axis of abscissas thereof expresses the adjustment number of times,, and the maximal value thereof is the value designated as the convergence number of times in setting of adjustment parameters. The designatedconvergence error is displayed with a straight line on this graph. Since adjustment is executed column after column, a column number is input here and adjustment is executed, and the execution results of adjustment are calculated and displayed every ten times on this graph. The adjustment is terminated when either condition of the convergence error or the convergence number of times which is set in setting adjustment parameters is materialized.

Figure 22:
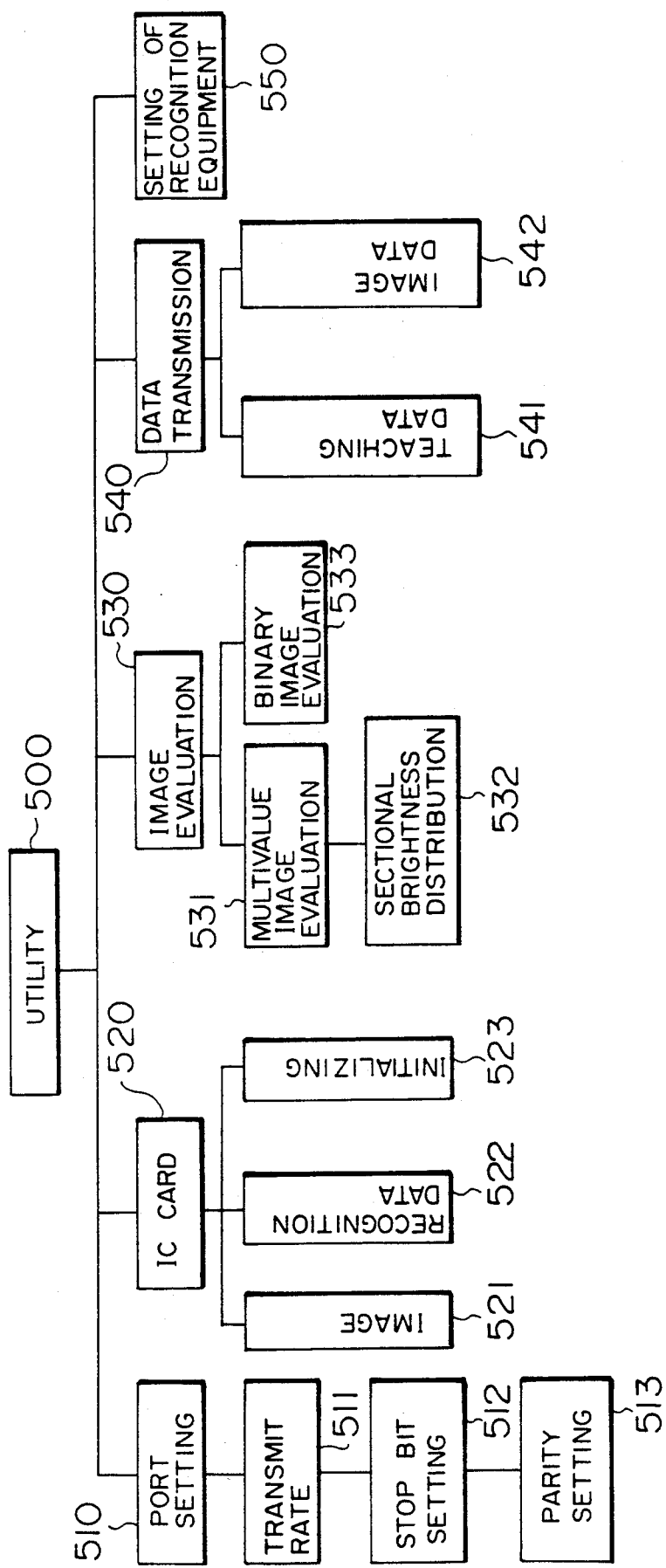
FIG. 22 is a block diagram showing a function in utility mode of a character recognition equipment according to the present invention.

FIG. 22 is a block diagram showing the function of the utility mode of the character recognition equipment 10 shown in FIG. 14 (FIG. 2). In the present character recognition equipment 10, an IC card 17 may be used an as external memory, and teaching data and image data can also be stored. In this utility mode 500, there are provided a port setting function 510, an interface function 520 of the IC card, an image evaluation function 530, a data transmission function 540 and a setting function 550 of the character recognition equipment. First, in the port setting function 510, there are provided a transmission speed setting 511, a stop bit setting function 512, and a parity setting function 513. In the interface function 520 of an IC card, there are provided a function 521 for loading and erasing the image of the IC card 17 and saving the image on an IC card, a function 522 for loading and erasing the recognition data of the IC card and saving the image on the IC card, and a function 523 for initializing the IC card. Each of these processings can be executed in a simple manner in accordance with the instructions of the menu. For example, when the image saving function 521 is selected, a menu screen is displayed in which a raw image is displayed and the image to be saved is input from the TV camera 23. Here, when carriage return is input while keeping an image to be input visible, the screen is taken in, and then, when the IC card 17 is inserted and the title of image data is input, the image taken-in is saved. In the multivalued image evaluation 531 of the image evaluation 530, a raw multivalued image is displayed for the purpose of adjustment of the optical system. Also, when the sectional brightness distribution display 532 is selected, a raw image from the TV camera is displayed. Therefore, the image is taken in when an appropriate image appears. A horizontal line cursor showing a sectional position is displayed thereafter on the image which has been taken in. Thus, when the sectional position is designated by moving the horizontal line cursor by using the up-and-down cursor key, a brightness graph at that position is displayed. There is also provided a binary image evaluation function 533. In a data transmission function 540, there are provided a data transmission 541 of teaching data and a transmission 542 of the image data.

Next, a method of executing adjustment processing of the thresholds and the weights of the feature units 41, 42 and 43 and the output units 61, 62 and 63 while processing character recognition will be explained. This is possible in the automatic recognition mode and the semiautomatic recognition mode of the character recognition equipment 10. In both the automatic recognition mode and the semiautomatic recognition mode, it is judged whether the adjustment mode in FIG. 16 is to be executed or not (step 164) and it is also judged whether the adjustment mode in FIG. 17 is to be executed or not (step 175) after performing above-described sum check in FIG. 16 (step 163) and sum check in FIG. 17 (step 174). Such a judgement is made depending on whether adjustment during recognition has been designated as one of setting 550 of the character recognition equipment among the utility function 500 shown in FIG. 22. When adjustment during recognition is performed, it is possible to have even an object in which the printing quality of the character is varied follow and adapt to the variation. Further, even when the character recognition equipment 10 is used in a different environment, complicated installation is not required but stabilized recognition is made possible by adjusting during recognition in the environment of installation. FIG. 23 is an explanatory diagram showing a time chart when the character recognition equipment 10 shown in FIG. 14 (FIG. 2) adjusts the thresholds and the weights while performing recognition. In FIG. 23, adjustment calculation is possible by time sharing during periods 753, 754 and 755 when character recognition is being performed. However, an adjustment calculation takes a longer time than a recognition calculation. Therefore, adjustment of the periods 156 and 157 for executing adjustment is performed during the periods 751 and 752 for loading and unloading of the work 25 which is the recognition object. Thus, online adjustment is made possible without disturbing the execution of the character recognition equipment 10. Moreover, when the degree of recognition confidence is found low as the result of recognition, it is also possible not to perform adjustment of the character image used.

Next, the composition of the special feature units 41, 42 and 43 will be explained. The function of above-described feature units has been to perform a calculation on the values obtained by adding the thresholds to the output values from the input units 31, 32 and 33 and to output the calculation results, but it is possible to provide inversion feature units which output the values obtained by subtracting the output values of the feature units from the maximum values of the output of abovedescribed feature units as feature units for other functions. Thus, the abovedescribed feature units produce bigger outputs as the output values of the input units get bigger, whereas the inversion feature units produce bigger outputs as the output values from the input values get smaller. It also means that effective action is operated when the fact that there is nothing in the window regions of the input units is the feature of the character. The output y of these inversion feature units may be expressed in a following expression by using the output y of the feature units obtained previously by the expression (1).

$$y1, n+j = 1 - y1,j \quad (6)$$

The calculation of these feature units may be modified as shown in the following expression.

$$w1,k,j \times y1,j + w1,k,j + n \times y1,n + j = \quad (7)$$
$$w1,k,j \times y1,j + w1,k,j + n \times (1 - y1,j) =$$

-continued
$$(w1,k,j - w1,k,j + n) \times y1,j + w1,k,j + n$$

Accordingly, even if no inversion feature unit is provided, the function similar to that when inversion feature units are provided can be implemented as shown in the following expression (8) by determining the thresholds of the output units 61, 62 and 63 appropriately from the above-mentioned relative expression (7).

$$z2,k = \sum_{j=1}^{n} \{w1,k,j \times w1,k,j + n) \times y1,j + w1,k,j + n\} \quad (8)$$

In this case, the number of the feature units needed is half of that needed when the inversion feature units are provided. Therefore, the calculation of character recognition gets less complex and quicker accordingly. However, since it is easier to obtain the thresholds of these output units when the weights are adjusted under a state where the inversion feature units exist, a method in which the inversion feature units are provided at the time of adjustment and the invention feature units are removed at the time of character recognition is effectual.

Figure 24A:
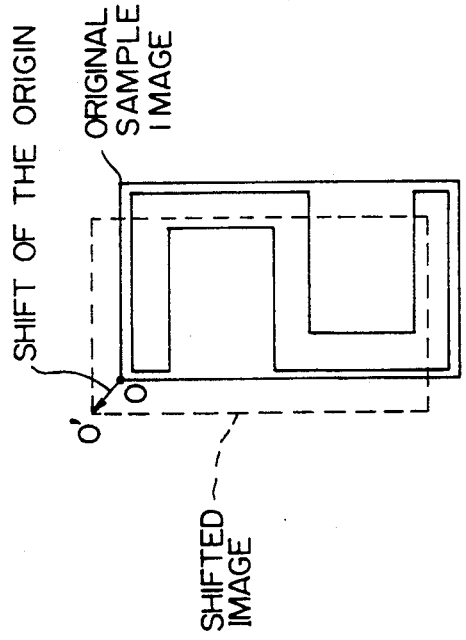
FIGS. 24A and 24B are explanatory diagrams showing a method of automatically creating an image in which dislocation is generated from the sample image and an image in which brightness is varied in the character recognition equipment of the present invention.
Figure 24B:
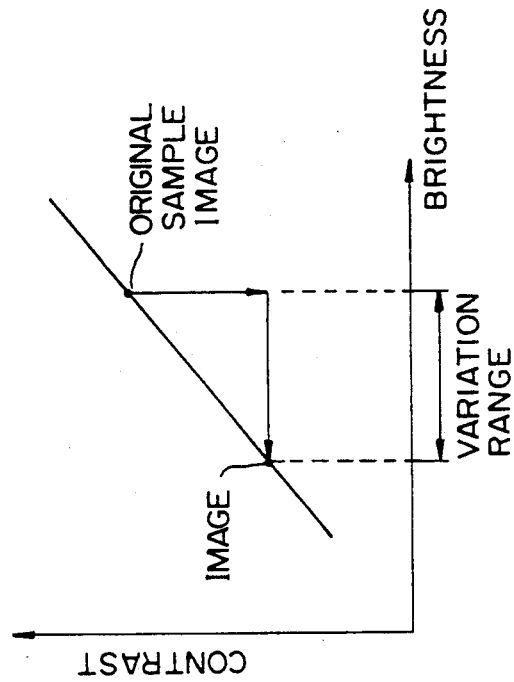

Lastly, sample character images for adjusting the thresholds and the weights of the feature units and the output units will be explained. As these sample character images become more varied, an adjustment which can correspond to variety of cases must be made. However, many manhours are required to collect various character images as samples. Accordingly, if a positional dislocation range and the variation range of brightness are designated for one character image, adjustment using various sample images can be made without spending so many manhours by arranging to create automatically an image which has dislocated from the sample image and an image in which the brightness has been varied. FIGS. 24A and 24B are explanatory diagrams showing a method in which the character recognition equipment 10 shown in FIG. 14 (FIG. 2) automatically creates an image which has a positional dislocation from the sample image and an image in which the brightness has been varied. As shown in FIG. 24A, automatic creation of an image which has dislocated the position thereof can be implemented by shifting the origin O of the original sample image to O' within a range designated as the variation range. For example, when the variation range is specified to be plus or minus three picture elements, it is possible to obtain a dislocated sample image by using 49 types of images in which the origin O of the sample image is shifted by +2, +2, °1, 0, ~2 and −3 both in X and Y directions. Similarly, when the variation range of brightness from the original sample image is specified as shown in FIG. 24B, it is possible to obtain a sample image having a contrast with brightness variation by creating an image in which the density is varied by the variation range.

Next, types of image processing in the input units will be explained with reference to another image processing method. The image processing performed in the input units 31, 32 and 33 shown in FIG. 3 included five types, that is, differential from the top on a lateral character's line, differential from the bottom on the lateral character's line, differential from the left on a longitudinal character's line, differential from the rights on the longitudinal character's line and density sum. As was explained with reference to FIG. 3, this differential processing is a system of adding differential values in the vertical direction with respect to the character's line, and density sum is a system for obtaining the mean value of the density in the windows. This image processing method is effective for a character having a poor contrast such as a laser printing character on a ceramic surface. The present character recognition equipment 10 is provided with twelve image processing types, that is, four image processing types in which a differential value is obtained by primary differential on a variable density image in the window thereby to detect the edge, four image processing types in which a differential value is obtained by secondary differential on a variable density image in the window thereby to detect the edge, two image processing types in which the inside of the window is binarized and the area of the white region (or black region) in that window is counted, and two image processing types in which the inside of a window is binarized and the edge is detected with respect to the binarized image in addition to five types of image processing described above. Next, each of these twelve types of image processing will be explained.

Figure 25A:
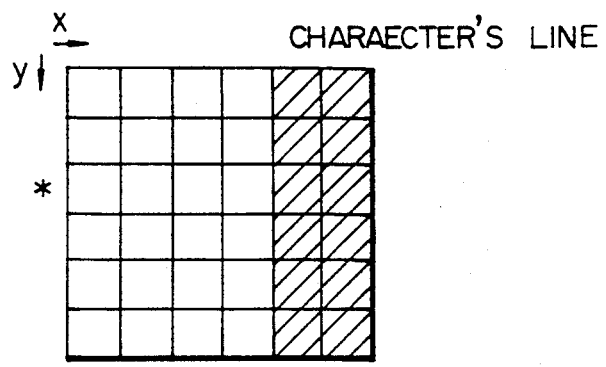
FIGS. 25A, 25B and 25C are explanatory diagrams showing a processing example on an image processor of the input unit in FIG. 1.
Figure 25B:
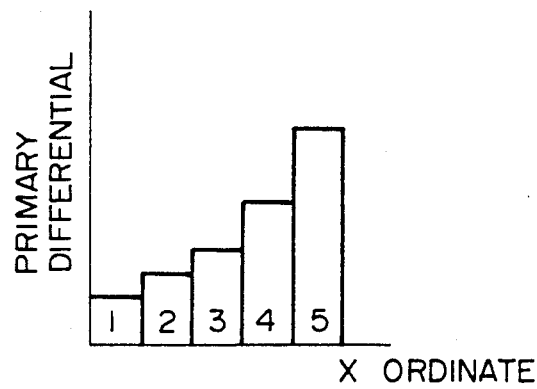
Figure 25C:
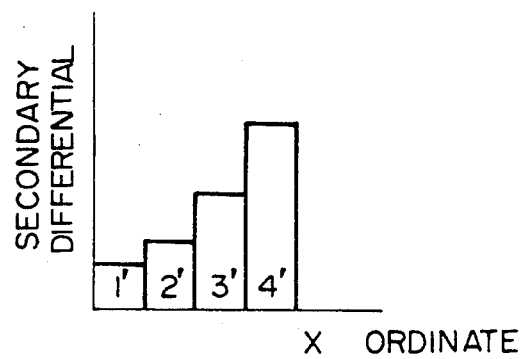

First, a method of detecting the edge by primary differential or secondary differential on a variable density image will be explained in conjunction with FIGS. 25A through 25C. FIGS. 25A, 25B and 25C are explanatory diagrams of an edge detecting method by primary differential and secondary differential from the left among image processings within the windows. FIG. 25A shows an example of a window which is cut on the longitudinal character's line, and the hatched portion represents the character's line in this diagram. FIG. 25B shows primary differential values with respect to the line marked with an asterisk in X direction when primary differential is applied from the left in X direction in this window. FIG. 25C also shows secondary differential values from the left in X direction in the window with respect to the line marked with an asterisk. First, primary differential will be explained. As shown in FIG. 25B, primary differential values in the window are calculated with respect to each line. Then, the maximum value of the primary differential values for respective lines is obtained and the sum of the differential values is calculated for all the lines, and a mean value of the maximal values of differential values is calculated by dividing said sum total by the number of the lines in that window. This value is adopted as the output value of the input unit. Next, the secondary differential will be described. As shown in FIG. 25C, secondary differential values in the window are calculated with respect to each line. Then, similarly to primary differential, the maximal value of secondary differential values of respective lines is obtained and the sum total of these differential values are calculated for all the lines, and a mean value of the maximal values of secondary differential values obtained by dividing the sum total by the number of the lines in that window is calculated, and this value is adopted as the output values of the input units 31, 32 and 33. By normalizing the result of image processing with the size of the window in this manner, it is possible to obtain the output value of the input unit which is independent of the size of the window.

Next, a method of binarizing the inside of the window and counting the area of the black region in the window will be explained. The use of this system of image processing within the window is limited to situations where a stabilized binary image which has comparatively good contrast is obtainable. First, the inside of the window is binarized, and then the number of picture elements corresponding to black is counted in the binarized window. The output values of the input units 31, 32 and 33 are obtained by dividing the number of counted black picture elements by the area of the window. Here, even if the counted picture elements are white picture elements instead of black picture elements, the inversion units are equivalent exactly to the above. For the binarization thresholds, fixed binarized thresholds and binarized thresholds determined by, for example, an algorithm such as a p tile method and a discriminant analysis method may be used. However, when a binary image having a good contrast of the object character and is stabilized being obtainable, a method in which the result obtained through calculation on brightness of the character background by referring to that brightness is adopted as the binarized threshold is also effectural. As an example, a method in which 85~ of the brightness of the character background is adopted as the binarized threshold may be considered.

Next, a system in which the inside of the window is binarized and the edge is detected with respect to the binary image will be explained. The use of this system of image processing in the window is also limited to situations where a binary image having comparatively good contrast and being stabilized is obtainable. First, the inside of the window is binarized and the portion where white borders black is detected as the edge with respect to each line in the binarized window. The line mentioned here is defined in the same way as the line for primary differential and secondary differential on the variable density image which was explained with reference to FIG. 25, and has a direction perpendicular to the character's line. When the edge is detected with that line, the same edge detection method is applied to the next line, and detection is made on all the lines in the window. Then, when the processing of all the lines is complete, the number of lines which ave detected the edges in the window is calculated and normalized with the sizes of the window, which are adopted as the output values of the input units 31, 32 and 33.

Figure 26:
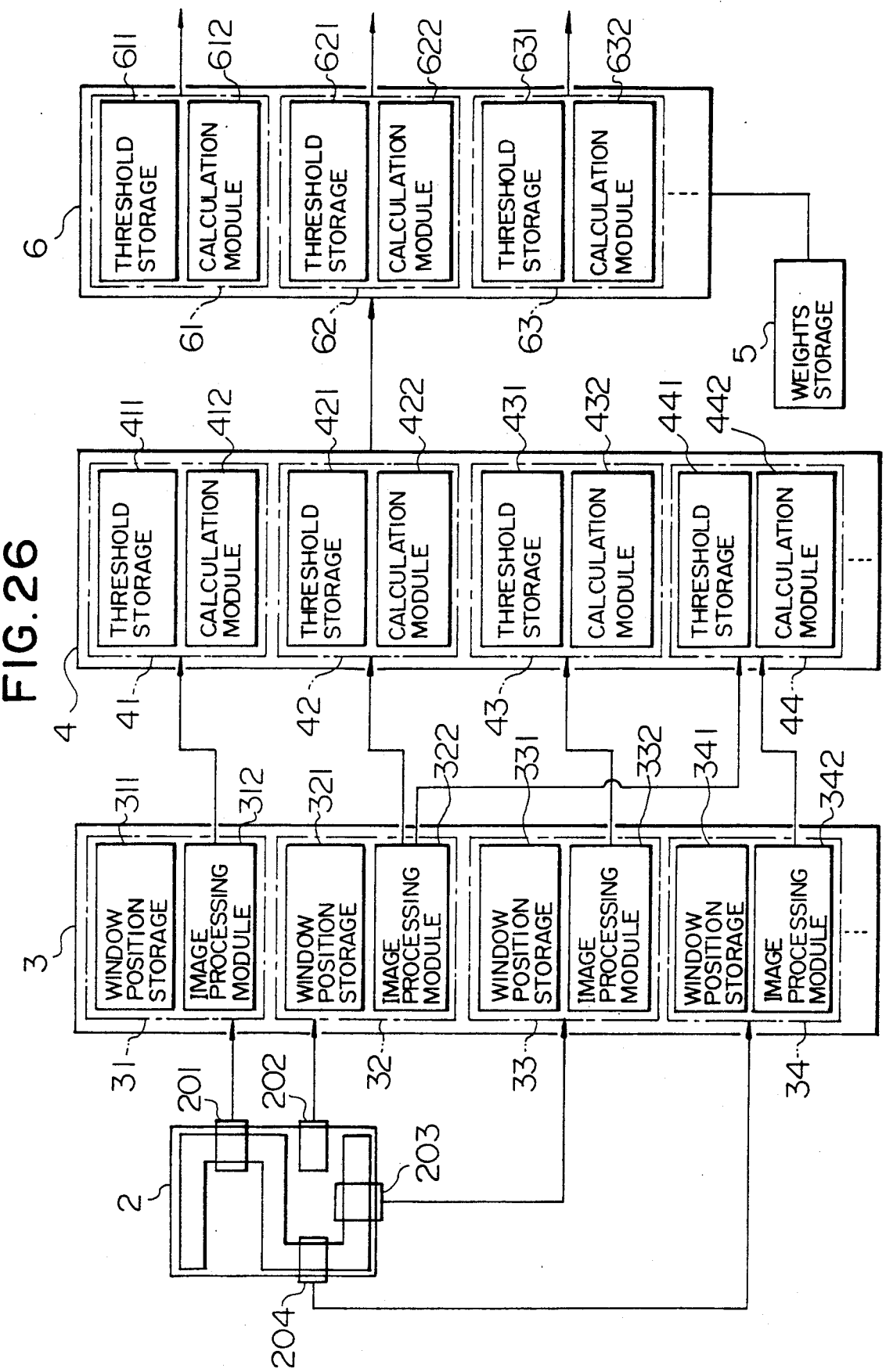
FIG. 26 is an explanatory diagram of a combined feature unit.

Next, a special feature unit 44 in which two or more windows are combined will be explained. The above-described feature units have been the feature units which calculate the values obtained by adding the thresholds to the output values from the input units 31, 32 and 33 and output the calculation results and the feature units which output the inverted results. The input value of these feature units is a mean value of the sizes of differential values and the brightness in the window. Therefore, when the density of printing is varied, the mean value of the sizes and the brightness of the differential values is varied greatly, being different from the case when the brightness is varied, and feature extraction cannot be performed correctly. In order to solve such a problem, a combined feature unit 44 having the relative values of the output values of the inputs units 31, 32 33 and 34 as the input values by combining a plurality of input units is provided. This combined feature unit will be explained in conjunction with FIG. 26. FIG. 26 is an explanatory diagram showing an example of a combined feature unit which in a special feature unit of the character recognition equipment 10 shown in FIG. 14 (FIG. 2). The feature unit 44 shown in FIG. 26 combines the output values of the input units 32 and 34 of the input unit group 3 as the input. First, above-described respective input units 31, 32, 33, 34 . . . perform image processing in the windows in the image processing modules 312, 322, 332, 342 . . . based on window position data which are stored in the window position storages 311, 321, 331, 341 . . . , and adopt the results of image processing as the output values of the input units. The feature unit 44 combines the output values of the input units 32 and 34 of the input unit group 3 so as to adopt the results of image processing as the input. In this case, when the output values of the input units 32 and 34 are input to the feature unit 44, the operation module 442 of the feature unit 44 obtained the difference between the output values of two input units, and performs calculation on the value obtained by adding the threshold stored in the threshold storage 441 to said difference so as to obtain the output value of the feature unit 44. The inputs units are combined not only by using the difference between the output values of two inputs units, but also by using one of the output values of three or more input units sometimes. For example, when three input units are used, a mean value of the output values of two input units is obtained first, and then the difference between this means value and the output value of another input unit so as to obtain the input value of the feature unit 44. Such average calculation and calculation to obtain the difference are executed in the feature unit calculation module 442, and calculation is performed on a value obtained by adding the threshold stored in a threshold storage 441 so as to obtain the output value of the feature unit 44. It is also possible that this combined unit is included among ordinary units, and the input units that are input to ordinary feature units are used for the combined unit.

Next, setting and altering the combination of these input units will be explained in conjunction with FIG. 27. FIG. 27 shows a menu screen for setting and altering the input units for the abovedescribed combined feature unit. First, the number of the feature unit for which the combination is set is input. FIG. 27 shows an example in which "1" is input. Next, the number of input units of the first term for which combination is performed is input, and then the number of the input unit (window) is input. For the second term, the number of the input units is input, and then the input units are input. When a plurality of input units exist, input marked-off with commas. Lastly, the number setting or deleting the combination is input so as to perform setting or alteration. The values in the first term and the second term which are set here are input to the feature unit. Next, the calculation performed in the feature unit calculation module 442 will be explained. The calculation in this combined feature unit is performed in accordance with the image processing types as follows.

(1) When the image processing type is differential processing: feature unit input value=(combination 2nd term—combination 1st term)+threshold
(2) When the image processing type is density sum processing: feature unit input value=(combination 2nd term—combination 1st term)/combination 2nd term+threshold
(3) When the image processing type is binarization processing: feature unit input value=(combination 1st term—combination 2nd term)+threshold After the input value of the feature unit is computed in above-mentioned (1) through (3), remaining processing is exactly the same is the feature unit described previously, and the inversion feature unit for these feature units can also be formed. That is, this combined feature unit is different only in the calculation performed in the feature unit calculation module, and can be handled exactly in the same manner as the feature units heretofore used which is not the combined feature units for others. Thus, the combined feature unit can be used at the same time together with a feature unit which is not a combined feature unit. Besides, as to the method of determining the combination of the input units, that, is a subject that which input units are to be combined, optimum combination of the input units is determined by employing, for example, a technique of main component analysis or a technique such as a variable selecting method among conventional multivariate analysis.

Next, another adjustment method of the thresholds and the weights will be explained. The thresholds and the weights may be adjusted successively by a method explained in conjunction with FIG. 4, but they may be obtained by using a multiple-regression model. According to this method, the weights can be calculated simply. In this multiple-regression model, when it is assumed that the output values of the feature units are $y1,j$ and the weights are $w'1,k,j$, the output values of $o2,k$ of the output units may be expressed as shown in the following expression.

$$o2,k = \sum_{j=1}^{2n} w'1,k,j \times y1,j \qquad (9)$$

That is, in order to recognize a certain image, the output value $y1,j$ of the feature units may be calculated first. At this time, it is found that, if it is considered with respect to all the character types assuming that "1" is given to a correct interpretation of the character of the image and "O" is given to others for $o2,k$ corresponding to the output values of the output units, the weights $w'$ can be calculated simply by solving simultaneous equations that are equal in number to variables $w'$ expressed by a suffix k in the expression (9) and the number of the output units. As to the thresholds of the feature units, a statistical means value is obtained with respect to the image which was input, and may be adopted as the feature unit threshold. Recognition performance may be achieved to some extent by using the thresholds and the weights obtained by the above-described method, but adjustment processing explained in conjunction with FIG. 4 may also be performed with above said thresholds and the weights are initial values in order to further improve the recognition accuracy.

Figure 29:
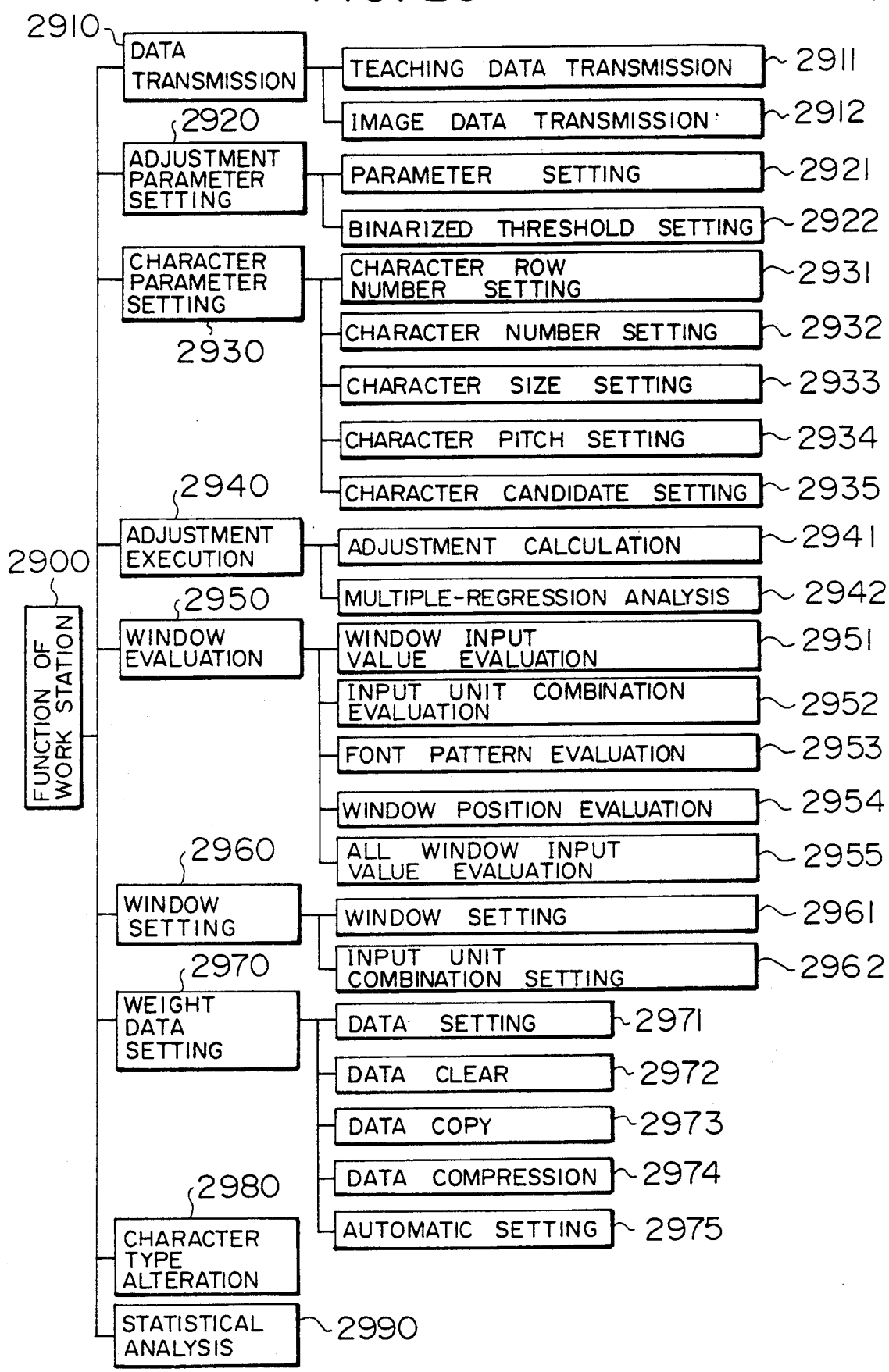
FIG. 29 is an explanatory view of the function of the work station shown in FIG. 28.

In the present character recognition equipment 10, it is possible to perform the above-described setting of the window, designation of image processing type in the windows and so forth using the work station by transmitting data through a telecommunication line. Now, an example in which another computer such as a work station is used for above-described setting of the windows, designation of image processing types in the windows and so forth will be explained in conjunction with FIG. 28 and FIG. 29. FIG 28 shows a screen showing a processing menu of the work station connected to the character recognition equipment 10 shown in FIG. 14 (FIG. 2). As shown, the work station includes functions of data transmission adjustment parameter setting, character parameter setting, adjustment execution, window evaluation, window setting, weight data setting, character type alteration, statistical analysis and termination. FIG. 29 is a block diagram showing an example of functions of the work station connected to the character recognition equipment 10 shown in FIG. 14 (FIG. 2). The function 2900 of this work station includes data transmission 2910, adjustment parameter setting 2920, character parameter setting 2930, adjustment execution 2940, window evaluation 2950, window setting 2960, weights data setting 2970, character type alteration 2980 and statistical analysis 2990. These functions correspond to the ten functions shown in FIG. 28. Similarly, the respective functions shown in FIG. 29 also select processing numbers by a processing menu corresponding to respective functions shown in FIG. 28.

First, data transmission 2910 includes a teaching data transmission function 2911 for the thresholds and the weights, etc. and an image data transmission function 2912. In an adjustment parameter setting function 2920, the values of constants Bk and Ck in the above-described adjustment expressions (4) and (5) are set, respectively, in a parameter setting function 2921 first. Further, in a binarized threshold setting function 2922, binarized thresholds are set.

In a character parameter setting function 2930, it is possible to alter or set the number of character rows, the number of characters in each row, longitudinal and lateral sizes of the character, longitudinal and lateral pitches of the character, and usable character candidates in each column included in the teaching data. First, the number of rows of a product number, etc. to be recognized, which is formed in a matrix, is set in a character row number setting function 2931, and the number of characters in every row is set in a character number setting function 2932. Longitudinal and lateral sizes of the recognition object character are set in units of picture elements in a character size setting function 2933, the pitch of the characters in the lateral direction is set in units picture elements in a character pitch setting function 2934, and longitudinal pitch, viz., the pitch between the rows is also set in units of picture elements in a character pitch setting function 2934 when there are two or more character strings. Further, in a character candidate setting function 2935, usable character candidates for each column are set in each column.

In an adjustment execution function 2940, adjustment of the thresholds and the weights explained in conjunction with FIG. 13 is executed. An adjustment execution function 2940 is a method which includes two modes, an adjustment calculation function 2941 and a multiple-regression analysis 2942 function, in which the adjustment calculation function 2941 uses above-described expressions (4) and (5) and the multiple-regression analysis function 2942 used the expression (9). In the adjustment calculation function 2941, first the column calculation which is to be performed is designated. Then the next execution is shifted to. In designating the column, when usable character candidates have been determined for each column as a product number, that character candidate is used. This character candidate can be set and altered by the character candidate setting function 2935 as described above. In the execution of adjustment calculation, a display with the latest value of the degree of confidence on every character for all the characters shown along the axis of ordinates and the character type shown along the axis of abscissas, a display with the value of the degree of confidence of the character immediately after calculation and the hysteresis since calculation has been started shown along the axis of ordinates and the character type shown along the axis of abscissas, and a continuous display with the value of the sum of square-law errors shown along the axis of ordinates and the number of times of adjustment calculation shown along the axis of abscissas are made.

A window evaluation function 2950 includes a window input value evaluation function 2951, an input unit combination evaluation 2952, font pattern evaluation function 2953, a window position evaluation function 2954 and an all window input value evaluation function 2955. In the window input value evaluation function 2951, a display is made with the values of the windows of all the characters shown along the axis of ordinates and the character type shown along the axis of abscissas by designating image processing type such as positions of the windows, above-described differentials and density sum, and binarization. Since the window is basically square in shape, the method of inputting a window position is to input at three points, that is, the x any y coordinates at the upper left portion, the x and y coordinates at the lower left portion and the x and y coordinates at the lower right portion. In the combination evaluation function 2952 of the input units, the feature unit in which above-described input units are combined is evaluated. The numbers of the inputs units (windows) to be combined are input first, and the output values of the feature unit at that time are displayed with respect to all the characters with the character types shown along the axis of abscissas and the output values of the feature units shown along the axis of ordinates. In the font pattern evaluation function 2953, the output values of the feature units against the positions of the windows and the image processing types which have been set are displayed for all the characters with the axis of abscissas showing the character type and the axis of ordinates showing the output value of the input unit. At this time, whether the binarization processing or variable density processing is input first. The character is designated next and this character is displayed with magnification to show the position of the window. Then, the number of the feature unit to be displayed is designated and the output value of the feature unit is displayed. The window position evaluation function 2954 is used to confirm the position of the window against the character frame, and the position of the window is displayed when the number of the window is input first. In the all windows evaluation function 2955, the character type is input, and the output value of each input unit is displayed with the axis of abscissas showing the window number and the axis of ordinates showing the output value of the input unit.

A window setting function 2960 includes two items, a window setting function 2961 and an input unit combination setting function 2962. In the window setting function 2961, a use graph showing whether a window is used or not, the image processing type for the window described above, and positional coordinates of the window are input and set. The position setting method of the window is similar to that in the window evaluation function 2950. In the input unit combination setting function 2962, the menu is the same as that shown in FIG. 27, and designation of the number of the feature unit in which combination is employed, selection of designation of whether the combination is set or altered and designation of whether deletion is to be made, and designation of the numbers of the input units to be combined are performed.

A weights data setting function 2970 is a function for manually inputting the initial values of the weights between the feature units and the output units, and includes a data setting function 2971, a data clear function 2972, a data copy function 2973, a data compression function 2974 and an automatic setting function 2975. The data setting function 2971 is a function used when the initial value of the weights for a specific output unit is set or altered, where the number of the output unit is designated first, and then a value to be set is input. The data clear function 2972 is a function to make all the weights for a specific feature unit zero, and is used for instance when an additional new feature unit is installed. Here, the number of the feature unit to be cleared is designated first. In the data copy function 2973, the thresholds and the weights are copied between columns. The number of columns having the thresholds and the weights to be copied is designated, and the number of the column which is desired to be copied is designated and copying is performed. In the data compression function 2974, the weights between the feature units and the output units are divided by a designated value so as to make the value of the weights smaller as a whole. This is used, for example, when the value gets too big and an overflow is produced. The automatic setting function 2975 is a function for determining the initial values of the thresholds and the weights. The value of the feature unit is calculated using an appropriate character image, and the initial value is determined based on the output value of that feature unit in such a manner that the initial value of the weights is determined to be $-1$ when the output value is 0 to 0.4, the initial value of the weights is determined to be 0 when the output value is 0.4 to 0.6, and the initial value of the weights is determined to be $+1$ when the output value is 0.6 to 1.0.

A character type alteration function 2980 is a function to alter or correct correspondence between the character image and the character type, and is used for creating teaching data in the adjustment calculation function 2941. Further, in case there is a character image of poor quality, recognition performance is at times deteriorated when this image is put in adjustment calculation. In this case, it is better to skip and not to use this image in adjustment calculation. At this time, adjustment calculation is not performed by designating the character types which are not used on this image from the character type alteration function 2980, and general recognition performance is not deteriorated.

In a statistical analysis function 2990, optimum combination of the windows (input units) is determined by a method called a variable selecting method. According to this method, all the combinations of the input units are calculated and the input units to be combined by a method called a variable selecting method are selected. This is a function in which reference of this selection is input first, the combination which can secure recognition performance shown by this reference is output, and adjustment calculation is adjustment execution 2940 can be performed with this combination. According to this use method, teaching data are first loaded by a teaching data transmission 2911 in a data transmission 2910, and image data that are used for adjustment or evaluation are loaded by an image data transmission 2912, thus executing respective functions.

According to the present invention, the recognition equipment adapts itself automatically to variations, even to an object in which the printing quality of the character and the font of the character are varied or printing state of the character is poor such as an image having poor contrast and an object in which breaking or thinning has been produced, thereby to implement stabilized recognition without being effected by the variations is obtainable.

We claims:

1. A character recognition equipment in which a character image is input and the input image is processed so as to discriminate a character type, comprising:

means for processing an image in a plurality of window regions set on the character image, wherein sizes and positions of the window regions may be set and altered in an interactive manner, said means for processing producing processing outputs said means for processing including a plurality of input units and, performing a processing operation selected from the following group of differential from the left processing, differential from the right processing, differential from the top processing, differential from the bottom processing, and density sum processing, on the windowed image, said types of processing can be designated in an interactive manner;

first means for performing calculations on values obtained by adding thresholds to said processing outputs, and provides calculation results, wherein said first means for performing calculations includes a plurality of feature units; and second means for performing calculations on values obtained by multiplying the calculation results from respective units of said first means by a respective weight and adding thresholds to the sum total thereof, wherein either one of the thresholds or the weights or both of them are adjustable by using recognition results.

2. A character recognition equipment according to claim 1 wherein each of the plurality of the weights is initialized by selection by a user of one of three types of designation made by a user, said three types of designation being: existence of a character's line in a respective one of said plurality of window regions, non-existence of a character's line in a respective one of said plurality of window regions, and uncertainty as to the existence of a character's line.

3. A character recognition equipment according to claim 1, wherein processing outputs independent of the sizes of the windows are obtained by normalizing the values of each of the image processing results with the sizes of the corresponding windows in image processing in the window regions.

4. A character recognition equipment according to claim 1, wherein, when a differential is designated in image processing in the window regions, differential values in a designated differential direction are added according to depths of the windows, and values obtained by dividing said addition values by widths of the windows are adopted as the output values of the means for processing.

5. A character recognition equipment according to claim 1, further, comprising means for designating a density sum in image processing in a window region, said means for designating a density sum adds densities of fall picture elements in the window and divides the addition values by the number of picture elements, and adopts values obtained therefrom as the outputs of the input unit that corresponds to said window region.

6. A character recognition equipment according to claim 1, further comprising: means for adjusting the thresholds and the weights; means for holding the image density when the thresholds and the weights are adjusted in image processing in the window regions; and means for compensating the density of the character image, said means for compensating compares the density with the density of a recognition object character.

7. A character recognition equipment according to claim 1, further comprising means for recognizing a character string and means for designating the types of the recognition object character for each column of a character string such that when a character string consisting of a plurality of characters is recognized, the thresholds and the weights are held separately for each column of the character string, and character recognition is performed using them.

8. A character recognition equipment according to claim 1, further including means for providing a message such that when the maximum value of respective output values of the output unit group which shows a judging result of the character is at a preset absolute judgment threshold or less, said message indicates that character recognition cannot be performed.

9. A character recognition equipment according to claim 1, further including a second means for providing a message such that, when the difference between the maximum value and the second highest value among respective output values of the output unit group showing a judgment result of a character is at a preset relative judgment threshold or less, said message indicates that character recognition cannot be performed.

10. A character recognition equipment according to claim 8 or claim 9, further including a means for setting and altering the absolute judgment threshold or the relative judgment threshold in an interactive manner.

11. A character recognition equipment according to claim 1, further including means for obtaining a value of the sum total of character values when a character string having a predetermined number of characters is recognized, means for recognizing a printed character string as well as the sum total value, means for summing the values of recognized characters, means for checking whether the sum total value coincides with printed sum total value, and a means for providing a message such that if the sum total value does not coincide with the printed sum total value, the message indicates that character recognition cannot be performed.

12. A character recognition equipment according to claim 11, further including a means for setting and altering the number of columns showing the sum total value of a character string in an interactive manner.

13. A character recognition equipment according to claim 1, further comprising means for transmitting a character image from the character recognition equipment to another computer, and for transmitting adjustment results to the character recognition equipment again after executing an adjustment of the thresholds and the weights.

14. A character recognition equipment according to claim 1, having a recognition operation mode selected from three modes including:
an automatic recognition mode in which a character is recognized by a command for recognition start from an equipment other than the character recognition equipment and the recognition result is transmitted to the other equipment;
a semiautomatic recognition mode in which a user is asked to confirm a judgment result when the maximum value among respective output values of the output units which recognize the character in accordance with the command for recognition start from an equipment other than the character recognition equipment and show the character judgment result is at a preset semiautomatic judgment threshold or below, and the recognition result is transmitted to the other equipment after correcting the recognition result in an interactive manner when the recognition result is wrong; and
a manual recognition mode in which a character is recognized by inputting the command for recognition start through a keyboard, and the recognition result is displayed on a monitor screen.

15. A character recognition equipment according to claim 1, further comprising a means for executing adjustment processing of the thresholds and the weights while processing character recognition.

16. A character recognition equipment according to claim 15, further comprising means for designating whether or not adjustment processing of the thresholds and the weights is to be executed while processing character recognition.

17. A character recognition equipment according to claim 1, further comprising an inversion feature unit outputting a value obtained by subtracting the output value of a feature unit from the maximum value obtainable as the output of that feature unit to respective feature units of the feature unit group.

18. A character recognition equipment according to claim 17, wherein a weight producing a similar result as that under a state in which the inversion feature unit is not removed, under such a state that the inversion feature unit has been removed, is obtained from the weights of the feature units and the inversion feature unit, and character judgment is executed under the state that the inversion feature unit has been removed.

19. A character recognition equipment according to claim 1, further comprising means for designating a positional dislocation range and a brightness variation range of a character; means for automatically creating a dislocated image and an image in which brightness has been varied from a sample image used for adjustment when the positional dislocation range and the brightness variation range of a character are designated in adjustment processing of the thresholds and the weights, such that adjustment processing is performed.

20. A character recognition equipment according to claim 1, further comprising means for obtaining two of either a processing result of one input unit or a mean value of output values of a plurality of input units; means for combining the two values; third means for performing calculation on the combination of the two values, and means for adopting the calculation result as the input value of a feature unit.

21. A character recognition equipment according to claim 20, further comprising means for optionally setting or altering said combination.

22. A character recognition equipment according to claim 1, further comprising means for designating object characters; means for performing character judgment; and means for designating the type of a recognition object character for each column of a character string when a character string consisting of a plurality of characters is recognized,
wherein all the thresholds and the weights are common to each column, and character judgement is performed among recognition object characters designated at the time of recognition judgement.

23. A character recognition equipment according to claim 1,
wherein there are provided, as the types of image processing in the region within the window, secondary differential function in the window, edge extracting function for a binarized image in the window, and an image processing function for counting the area of white region or the area of black region of the binarized image in the window, in addition to image processing in the window.

24. A character recognition equipment in which a character image is input and the input image is processed so as to discriminate a character type comprising:
an input unit group comprising a plurality of input units wherein each of said input units processes an image from a respective one of a plurality of window regions set on the character image and outputs a processing result;
wherein positions and sizes of the window regions may be set and altered in an interactive manner and
wherein the types of image processing may be set and altered in an interactive manner;
a feature unit group comprising a plurality of feature units wherein each of said feature units perform calculations on a value, said value being obtained by adding a threshold of each of said feature units to a respective one of the processing results, and outputs a calculation result;
an output unit group comprising a plurality of output units wherein each of said output units performs calculations on a second value, said second value being obtained by summing the products of each of a respective weight value of each of said output units and each of a respective one of the calculation results and adding to the sum a respective threshold of each of said output units;
wherein the thresholds of said feature units and/or the thresholds of said output units and/or the weights of each of said output units are adjustable by using recognition results.

25. A method for recognizing characters having poor contrast and having varied printing quality comprising steps of:
a) storing an image of an object to be recognized in an image memory;
b) dividing the image in the image memory into a plurality of windows determined by a plurality of window positions stored in a plurality of means for window position storage;
c) processing each of the plurality of windows with a corresponding one of a plurality of image processing modules to obtain a plurality of outputs $R_i$;
d) applying each of the plurality of outputs $R_i$ to a corresponding one of a plurality of feature units;
e) calculating a plurality of second outputs $Y_i$ with said plurality of feature units such that:

$$Y_i = \frac{1}{1 + e^{-Z_i/T}}$$

where:
T is a constant;
$Z_i = \text{FTHRESHOLD}_i + R_i$; and
$\text{FTHRESHOLD}_i$ is a threshold value stored in the $i^{th}$ one of the plurality of feature units;

f) applying each the plurality of second outputs $Y_i$ to a corresponding one of a plurality of output unit groups;
g) calculating a plurality of third outputs $O_k$ with said plurality of output units groups such that:

$$O_k = \frac{1}{1 + \exp - \frac{Z_{2,k}}{T}}$$

wherein:
T is a constant;

$$Z_{2,k} = \sum_{j=1}^{2n} [W_{1,k,j} \times Y_{1,j}] + \text{Threshold}_k;$$

k≡the number of the respective output unit;
j≡the number of the respective feature unit;
n≡the total number of feature units; and
$\text{OTHRESHLOD}_k$≡the threshold of the $k^{th}$ one of the plurality of output units; and h) determining the character recognized by determining the output unit associated with the maximum value of $O_k$.

26. A method for recognizing characters having poor contrast and having varied printing quality according to claim 25 wherein:
the image processing modules perform a type of image processing selected from the group including:
differential processing from the right;
differential processing from the left;
differential processing from the top;
differential processing from the bottom; and
density sum processing.

27. A method for recognizing characters having poor contrast and having varied printing quality according to claim 26 wherein the density sum of a window region is determined by:
a) obtaining a sum by adding densities of all picture elements in the window; and
b) dividing the sum by a number of picture elements in the window.

28. A method for recognizing characters having poor contrast and having varied printing quality according to claim 25 wherein the plurality of the window positions stored in the plurality of window position storages may be defined in an interactive process including steps of:
a) defining an outer frame of a character to be recognized by:
1) selecting an upper left corner of the outer frame of the character; and
2) selecting a lower right corner of the outer frame of the character;
b) selecting a number of window regions within said outer frame;
c) defining each of the number of window regions by selecting three corners of each of the number of window regions.

29. A method for recognizing characters having poor contrast and having varied printing quality according to claim 25 further including a step of
improving a recognition factor, when a character string constituting of a plurality of characters is to be recognized, by a process including steps of:
a) storing usable character candidates in means for character candidate storage;

b) checking each of the plurality of output unit groups with the character candidates stored in the means for character candidate storage;

c) calculating $O_k$ only for output unit groups, of the plurality of output unit groups, corresponding to the character candidates stored in the means for character candidate storage.

30. A method for recognizing characters having poor contrast and having varied printing quality according to claim 25 including a step of determining whether or not the character recognition has been completed with a required degree of confidence including sub-steps of:

a) interactively designating an absolute judgment threshold;

b) storing absolute value threshold in means for storing the absolute value threshold;

c) determining whether the maximum value of $O_k$ is greater than the absolute value threshold stored in the means for storing the absolute value threshold;

d) flagging the character recognition s inconclusive if the maximum value of $O_k$ is not greater than the absolute value threshold stored in the means for storing the absolute value threshold.

31. A method for recognizing characters having poor contrast and having varied printing quality according to claim 25 including a step of determining whether or not the character recognition has been completed with a required degree of confidence including sub-steps of:

a) interactively designating a relative judgment threshold;

b) storing the relative value threshold in means for storing the relative value threshold;

c) determining whether the absolute value of the difference between the maximum value of $O_k$ and a second highest value of $O_k$ is greater than the relative value threshold stored in the means for storing the relative value threshold;

d) flagging the character recognition as inconclusive if said difference is not greater than the relative value threshold stored in the means for storing the relative value threshold.

32. A method for recognizing characters having poor contrast and having varied printing quality according to claim 25 including a step of determining whether the character recognition has mis-recognized a numerical character including sub-steps of:

a) providing the numerical character to be recognized with a check sum number equaling the sum of other individual numerals of the numerical character;

b) determining whether the check sum of the numerical character recognized is equal to the sum of the other individual characters of the numerical character recognized; and c) determining the character recognized to be invalid when the check sum of the numerical character recognized is not equal to the sum of the other individual characters of the numerical character recognized.

33. A method for recognizing characters having poor contrast and having varied printing quality according to claim 25 including process for adjusting the thresholds of the plurality of feature units, the thresholds of the plurality of output units, and the weights via a computer external to a character recognition equipment including sub-steps of:

a) up-loading teaching data and recognition data from the character recognition equipment to the external computer;

b) adjusting the thresholds and weights using the teaching data and recognition data in the external computer; and c) down-loading the adjusted thresholds and weights from the external computer to the character recognition equipment.

34. A method for recognizing characters having poor contrast and having varied printing quality according to claim 25 wherein each of the plurality of outputs $R_i$ is normalized with respect to the size of a corresponding one of the plurality of windows prior to being applied to the corresponding one of the plurality of feature units.

35. A method for recognizing characters having poor contrast and having varied printing quality according to claim 25 including a step for adjusting thresholds and weight comprising sub-steps of:

a) determining $y_{1,j}$ from the equation:

$$O_{2,k} = \sum_{j=1}^{2n} w_{1,k,j} \times y_{1,j};$$

b) assigning "1" to the $O_{2,k}$ for the correct interpretation of a character and "0" to all other values of $O_{2,k}$; and c) solving k simultaneous equations for weights w.

36. A method for recognizing characters having poor contrast and having varied printing quality according to claim 35 wherein a position dislocation range and a brightness variation range are used when adjusting the thresholds and weights.

37. A method for recognizing characters having poor contrast and having varied printing quality according to claim 25 wherein the thresholds of the feature units, the thresholds of the output units and the weights are adjusted by a back-propagation method.

38. A method for recognizing characters having poor contrast and having varied printing quality according to claim 37 wherein a position dislocation range and a brightness variation range are used when adjusting the thresholds and weights.

39. A method for recognizing characters having poor contrast and having varied printing quality according to claim 37 wherein the back-propagation method includes sub-steps of:

a) applying a teaching signal to the plurality of output units;

b) correcting the weight $w_{1,k,j}$ between the $k^{th}$ output unit and the $j^{th}$ feature unit;

c) correcting the thresholds, FTHRESHOLD$_i$ of the plurality of the feature units;

wherein the teaching signal is an ideal value for the outputs of the plurality of output units such that a "0" is provided to an output unit corresponding to a character of correct interpretation and a "0" is provided to all other output units.

40. A method for recognizing characters having poor contrast and having varied printing quality according to claim 25 wherein two or more values of the plurality of outputs $R_i$ may be added before being applied to a feature unit.

41. A method for recognizing characters having poor contrast and having varied printing quality according to claim 25 wherein a mean value of a plurality of the plurality of outputs $R_i$ may be applied to a feature unit.

42. A method for recognizing characters having poor contrast and having varied printing quality according to claim 25 wherein any of the plurality of output $R_i$ may be combined and applied to a feature unit.

43. A method for recognizing characters having poor contrast and having varied printing quality according to claim 42 wherein the combination may be determined interactively.

44. A method for recognizing characters having poor contrast and having varied printing quality according to claim 25 wherein inversion feature units are supplied which subtract the second output $Y_i$ from a maximum second output $Y_{iMAX}$ such that the inversion feature units provide a second output $Y'_i$.

* * * * *

UNITED STATES PATENT AND TRADEMARK OFFICE
CERTIFICATE OF CORRECTION

PATENT NO. : 5,144,683
DATED : September 1, 1992
INVENTOR(S) : Hideaki Suzuki et al.

It is certified that error appears in the above-indentified patent and that said Letters Patent is hereby corrected as shown below:

| Column | Line | |
|---|---|---|
| 1 | 13 | After "divided" change "in" to --into--. |
| 1 | 38 | After "binarized" insert --,--. |
| 2 | 9 | Change "informations" to --information--. |
| 4 | 41 | After "Accordingly," change "is" to --if--. |
| 5 | 6 | Change "means" to --mean--. |
| 5 | 9 | Change "independent" to --independently--. |
| 5 | 21 | Change "y=1/(1+e-z/T)" to $--y=1/(1+e^{-z})--$. |
| 5 | 26 | Change "Y1j" to $--Y_{1,j}--$. |
| 5 | 27 | Change "W1,k,j" to $--W_{1,k,j}--$. |
| 5 | 33 | Change "z/2,k" to $--z_{2,k}--$. |
| 5 | 36 | Change "$Z_{2,k} = \sum_{j=1}^{2n} w1,j,k \times y1,j$ to $--z_{2,k} = \sum_{j=1}^{2n} w_{1,j,k} \times y_{1,j}--$. |
| 5 | 37 | Change "$Z_{2,k} = \Sigma w_{ij,k} \times y_{1j}$" to $--z_{2,k} = \Sigma w_{1,k,j} \times y_{1,j}--$. |

UNITED STATES PATENT AND TRADEMARK OFFICE
CERTIFICATE OF CORRECTION

PATENT NO. : 5,144,683
DATED : September 1, 1992
INVENTOR(S) : Hideaki Suzuki et al.

It is certified that error appears in the above-indentified patent and that said Letters Patent is hereby corrected as shown below:

| Column | Line | |
|---|---|---|
| 5 | 38 | Change "$O_k=1/(1+e-z/T$" to --$o_k=(1+e^{-z2k/T})$--. |
| 5 | 55 | Change "W1,j,k" to -- $w_{1,k,j}$ --. |
| 5 | 58 | Change "Wo,j" to --$w_{o,j}$--. |
| 5 | 60 | After "group 4" change "is" to -- are --. |
| 5 | 63 | Change "o" to --0-- (zero). |
| 5 | 67 | Change "given" to --gives--. |
| 5 | 68 | Change "o" to --0-- (zero). |
| 6 | 1 | Change "correct on" to --correction--. |
| 6 | 5 | Change ")66 wo,j" to --$\Delta w_{o,j}$--. |
| 6 | 6 | Change "are $\Delta$W1,k,j" to --$\Delta w_{1,k,j}$ are--; change "C" to --$C_k$--. |
| 6 | 8 | Change "$\Delta$w1,k,j=(tk-ok)f(z2,k).Y1j" to --$\Delta w_{1,k,j} = (t_k - o_k) f'(z_{2,k}) \cdot Y_{1,j}$--. |
| 6 | 10 | Change "$\Delta$wo,j=Ckw1j,k(tk-ok)f(z1,k).f(z1j)" to --$\Delta w_{o,j} = C_k w_{1,j,k}(t_k - o_k) f'(z_{1,k}) \cdot f'(z_{1,j})$--. |
| 6 | 25 | Change "x" to --×--. |
| 6 | 27 | Change "x" to --×--. |
| 6 | 32 | Change "x" to -- × --. |
| 6 | 33 | Change "x" to --×--. |
| 11 | 42 | Change "of" to --or--. |
| 12 | 31 | Change "tion" to --tions--. |
| 13 | 2 | Change "whereby" to --thereby--. |

UNITED STATES PATENT AND TRADEMARK OFFICE
CERTIFICATE OF CORRECTION

PATENT NO. : 5,144,683
DATED : September 1, 1992
INVENTOR(S) : Hideaki Suzuki et al.

It is certified that error appears in the above-indentified patent and that said Letters Patent is hereby corrected as shown below:

| Column | Line | |
|---|---|---|
| 13 | 13 | Change "the with" to --with the--. |
| 13 | 60 | Change (-+) to --(++)--. |
| 16 | 5 | Before "1.0" (first occurrence) insert --is--. |
| 16 | 7 | After "times" delete "," (second occurrence). |
| 16 | 9 | Change "designatedcon-" to --designated con- --. |
| 16 | 22 | Change "an" (second occurrence) to --as--. |
| 16 | 23 | Before "external" change "as" to --an--. |
| 17 | 60 | Change "y1,n+j=1-y1j" to --$Y_{1,n+j} = 1-Y_{1,j}$--. |
| 17 | 65 | Change "w1,k,j x y1j + n x y1,n + j =" to --$W_{1,k,j} \times Y_{1,j} + W_{1,k,j+n} \times Y_{1,n+j} =$--. |
| 17 | 67 | Change "w1,k,j x y1j + w1,k,j+n x (1-y1j)=" to --$W_{1,k,j} \times Y_{1,j} + W_{1,k,j+n} \times (1-Y_{1,j}) =$--. |
| 18 | 2 | Change "(w1,k,j-w1,k,j+n) x y1j + w1,k,j+n" to --$(W_{1,k,j}-W_{1,k,j+n}) \times Y_{1,j} + W_{1,k,j+n}$--. |
| 18 | 12 | Change "z2,k = Σ {w1,k,j x w1,k,j + n) x y1j + w1,k,j + n}" to --$z_{2,k} = \Sigma \{W_{1,k,j} \times W_{1,k,j+n}\} \times Y_{1,j} + W_{1,k,j+n}\}$--. |
| 18 | 53 | Change "shifted by +2, +2, °1,0," to --shifted by +3, +2, +1, 0,--. |
| 18 | 67 | Change "rights" to --right--. |
| 20 | 16 | Change "being" to --is--. |
| 20 | 17 | Change "on" to --of--. |

UNITED STATES PATENT AND TRADEMARK OFFICE
CERTIFICATE OF CORRECTION

PATENT NO. : 5,144,683

DATED : September 1, 1992

INVENTOR(S) : Hideaki Suzuki et al.

It is certified that error appears in the above-indentified patent and that said Letters Patent is hereby corrected as shown below:

| Column | Line | |
|---|---|---|
| 20 | 40 | Change "ave" to --have--; after "detected" delete "the". |
| 20 | 59 | Change "inputs" to --input--. |
| 20 | 64 | Change "in" to --is--. |
| 21 | 19 | Change "inputs" to --input--. |
| 21 | 23 | Change "means" to --mean--. |
| 21 | 45 | After "input" (second occurrence) insert --is--. |
| 22 | 5 | Change "units" to --unit--. |
| 22 | 8 | After "that" delete ",". |
| 22 | 9 | After "is" insert --,-- and delete "a subject that". |
| 22 | 21 | Change "y1,j" to --$Y_{2,j}$--. |
| 22 | 22 | Change "w'1,k,j" to --$w'_{1,k,j}$--; change "o2,k" to --$o_{2,k}$--. |
| 22 | 27 | Change "o2,k = Σ w'1,k,j x y1j" to --$o_{2,k} = \Sigma\ w'_{1,k,j} \times Y_{1,j}$--. |
| 22 | 31 | Change "y1,j" to --$Y_{1,j}$--. |
| 22 | 35 | Change "O" to --0-- (zero); change "o2,k" to --$o_{2,k}$--. |
| 22 | 41 | Change "means" to --mean--. |
| 22 | 52 | Change "window" to --windows--. |
| 23 | 16 | Change "Bk" to --$B_k$--; change "Ck" to --$C_k$--. |

UNITED STATES PATENT AND TRADEMARK OFFICE
CERTIFICATE OF CORRECTION

PATENT NO. : 5,144,683
DATED : September 1, 1992
INVENTOR(S) : Hideaki Suzuki et al.

It is certified that error appears in the above-indentified patent and that said Letters Patent is hereby corrected as shown below:

| Column | Line | |
|---|---|---|
| 23 | 35 | Change "units" to --unit--. |
| 25 | 55 | Change "is" to --in--. |
| 26 | 12 | After "output" add --,--. |
| 26 | 58 | Change "further," to --further--. |
| 26 | 61 | Change "fall" to --all--. |
| 29 | 58 | Change "$Y_i$" to --$y_i$--. |
| 29 | 61 | In the formula, change "$Y_i$" to --$y_i$--; change "$1 + {}_e{-Zi/T}$" to --$1 + e^{-zi/T}$--. |
| 29 | 66 | Change "$Z_i$" to --$z_i$--. |
| 30 | 1 | After "each" insert --of--; change $Y_i$" to --$y_i$--. |
| 30 | 4 | Change "$O_k$" to --$o_k$--. |
| 30 | 7-9 | In the formula, change "$O_k$" to --$o_k$--; change "Z" to --z--.. |
| 30 | 11 | Change "wherein" to --where--. |
| 30 | 15 | Change "Z" to --z--; change "W" to --w--; change "Y" to --y--. |
| 30 | 24 | Change "$O_k$" to --$o_k$--. |
| 30 | 65 | After "constituting" delete "of". |
| 31 | 4 | Change "$O_k$" to --$o_k$--. |
| 31 | 17 | Change "$O_k$" to --$o_k$--. |
| 31 | 20 | Change "s" to --as--. |
| 31 | 22 | Change "$O_k$" to --$o_k$--. |

UNITED STATES PATENT AND TRADEMARK OFFICE
CERTIFICATE OF CORRECTION

PATENT NO. : 5,144,683
DATED : September 1, 1992
INVENTOR(S) : Hideaki Suzuki et al.

It is certified that error appears in the above-indentified patent and that said Letters Patent is hereby corrected as shown below:

| Column | Line | |
|---|---|---|
| 31 | 35 | Change "$O_k$" to --$o_k$--. |
| 31 | 36 | Change "$O_k$" to --$o_k$--. |
| 32 | 20 | Change "y1,j" to --$y_{1,j}$--. |
| 32 | 23 | change "$O_{2,k}$" to --$o_{2,k}$--; change "w1,k,j x y1,j" to --$w_{1,k,j} \times y_{1,j}$--. |
| 32 | 26 | Change "$O_{2,k}$" to --$o_{2,k}$--. |
| 32 | 28 | Change "$O_{2,k}$" to --$o_{2,k}$--. |
| 32 | 56 | Change '"0"' to --"1"--. |
| 34 | 6 | Change "$Y_i$" to --$y_i$--. |
| 34 | 7 | Change "$Y_{iMAX}$" to --$y_{iMAX}$--. |
| 34 | 8 | Change "$Y_i$" to --$y_i$--. |

Signed and Sealed this

Thirtieth Day of November, 1993

Attest:

BRUCE LEHMAN

Attesting Officer

Commissioner of Patents and Trademarks